(12) United States Patent
Kakeno

(10) Patent No.: US 10,397,435 B2
(45) Date of Patent: Aug. 27, 2019

(54) ELECTRONIC DEVICE

(71) Applicant: KYOCERA Document Solutions Inc., Osaka (JP)

(72) Inventor: Wataru Kakeno, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/963,580

(22) Filed: Apr. 26, 2018

(65) Prior Publication Data

US 2018/0314481 A1 Nov. 1, 2018

(30) Foreign Application Priority Data

Apr. 27, 2017 (JP) .................. 2017-088397

(51) Int. Cl.
*H04N 1/21* (2006.01)
*G06F 3/12* (2006.01)

(52) U.S. Cl.
CPC .............. *H04N 1/21* (2013.01); *G06F 3/1203* (2013.01); *G06F 3/1222* (2013.01); *G06F 3/1286* (2013.01); *G06F 3/1295* (2013.01)

(58) Field of Classification Search
CPC ........................................................ H04N 1/21
See application file for complete search history.

(56) References Cited

U.S. PATENT DOCUMENTS

2002/0060810 A1* 5/2002 Shiraiwa ............ G03G 15/5066
358/1.16
2005/0149571 A1* 7/2005 Jeon ..................... H04N 1/2112
2008/0183802 A1* 7/2008 Gray ..................... G06F 16/162
709/203
2009/0031069 A1* 1/2009 Habuto .................. G11B 27/10
710/303
2011/0113076 A1* 5/2011 Jo ....................... H04N 1/00411
707/822
2011/0122290 A1* 5/2011 Eun .................... H04N 1/00347
348/231.1

(Continued)

FOREIGN PATENT DOCUMENTS

EP           1898415 A1 *  3/2008   .......... G11B 27/034
JP     2004-062957 A      2/2004

(Continued)

*Primary Examiner* — Ted W Barnes
(74) *Attorney, Agent, or Firm* — Studebaker & Brackett PC

(57) ABSTRACT

An electronic device includes an operation section, first storage, second storage, a processing section, and a display section. The first storage stores data of a file therein. The file includes contents that can be printed. When the operation section receives an instruction for erasing the file, the processing section transfers the file from the first storage to the second storage. The display section displays an inquiry screen for inquiring whether or not to reproduce the file. When the operation section receives an instruction for reproducing the file, the processing section executes print processing or transmission processing. The print processing is processing for printing the contents. The transmission processing is processing for transmitting an email with the file attached thereto. After executing the print processing or the transmission processing, the processing section erases the file from the second storage.

14 Claims, 25 Drawing Sheets

(56) References Cited

U.S. PATENT DOCUMENTS

| | | | | |
|---|---|---|---|---|
| 2012/0078852 A1* | 3/2012 | Haselton | ............ | G06F 11/1451 |
| | | | | 707/654 |
| 2013/0268456 A1* | 10/2013 | Gumro | ................ | G06Q 10/083 |
| | | | | 705/333 |
| 2014/0063522 A1* | 3/2014 | Kobayashi | ............ | G06F 3/1207 |
| | | | | 358/1.13 |
| 2017/0019556 A1* | 1/2017 | Sekine | ................ | H04N 1/2104 |
| 2017/0052746 A1* | 2/2017 | Torii | ................... | G06K 15/181 |

FOREIGN PATENT DOCUMENTS

| | | | | |
|---|---|---|---|---|
| JP | 2004062957 | A | * | 2/2004 |
| JP | 2010089362 | A | * | 4/2010 |

* cited by examiner

ELECTRONIC DEVICE

INCORPORATION BY REFERENCE

The present application claims priority under 35 U.S.C. § 119 to Japanese Patent Application No. 2017-088397, filed on Apr. 27, 2017. The contents of this application are incorporated herein by reference in their entirety.

BACKGROUND

The present disclosure relates to an electronic device.

Computerized files (electronic files) of documents or the like are sometimes managed by an electronic device. However, in a situation in which files are managed using an electronic device, if a necessary file is erased (mistakenly erased) by an erroneous operation by a user, the erased file cannot be restored. Under the circumstances, various measures are proposed to eliminate the above problem. For example, a recording and reproducing device is proposed which gives a warning when a file for which backup data is absent is to be erased.

SUMMARY

An electronic device according to an aspect of the present disclosure includes an operation section, first storage, second storage, a processing section, and a display section. The operation section receives an instruction from a user. The first storage stores data of a file therein. The data of the file includes data of contents that can be printed. When the operation section receives an instruction for erasing the file, the processing section transfers the data of the file from the first storage to the second storage. When the data of the file is transferred from the first storage to the second storage, the display section displays an inquiry screen. The inquiry screen is a screen for inquiring whether or not to reproduce the file. When the operation section receives an instruction for reproducing the file while the inquiry screen is displayed, the processing section executes print processing, transmission processing, or transfer processing. The print processing is processing for printing the contents of the file. The transmission processing is processing for transmitting an email with the data of the file attached thereto. The transfer processing is processing for transferring the data of the file from the second storage to the first storage. When executing the print processing or the transmission processing, the processing section erases the data of the file from the second storage after the execution of the print processing or the transmission processing.

An electronic device according to another aspect of the present disclosure is capable of performing data communication with a file management device. The file management device manages data of a file. The data of the file includes data of contents that can be printed. The electronic device includes an operation section, a communication section, a processing section, storage, and a display section. The operation section receives an instruction from a user. The communication section is connected to the file management device. The processing section acquires the data of the file from the file management device through the communication section. When the operation section receives an instruction for erasing the file, the storage stores the data of the file acquired by the processing section. When the storage stores the data of the file, the display section displays an inquiry screen. Whether or not to reproduce the file is inquired through the inquiry screen. When the operation section receives the instruction for erasing the file, the processing section requests the file management device to erase the data of the file. When the operation section receives an instruction for reproducing the file while the inquiry screen is displayed, the processing section executes print processing or transmission processing. The print processing is processing for printing the contents of the file. The transmission processing is processing for transmitting an email with the data of the file attached thereto. After executing the print processing or the transmission processing, the processing section erases the data of the file from the storage.

DETAILED DESCRIPTION

Figure 1:
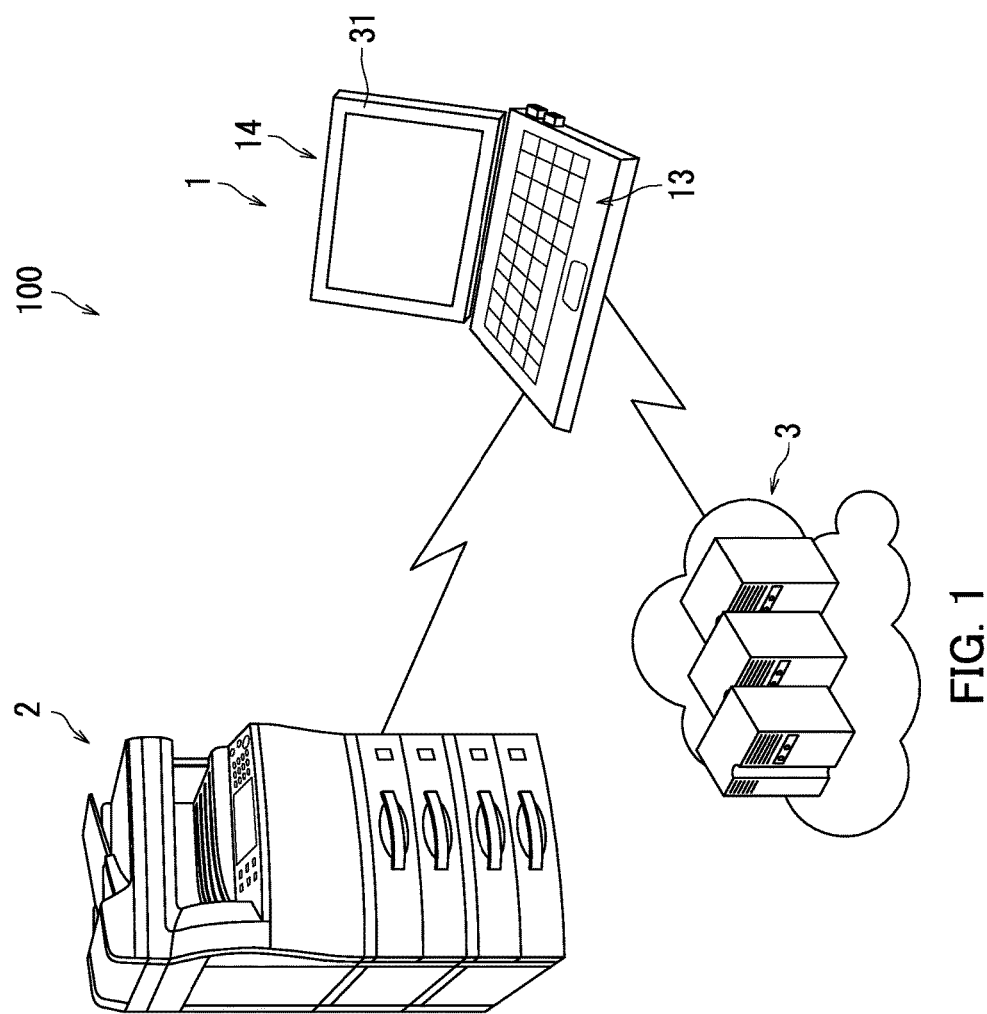
FIG. 1 is a diagram illustrating a file restoration system according to a first embodiment of the present disclosure.

The following describes embodiments of the present disclosure with reference to the accompanying drawings. However, the present disclosure is not limited to the embodiments described below. In the drawings, elements that are the same or equivalent are labelled using the same reference signs, and explanation of which will not be repeated.

First Embodiment

FIG. 1 is a diagram illustrating a file restoration system 100 (file reproduction system) according to a first embodiment. As illustrated in FIG. 1, the file restoration system 100 according to the first embodiment includes an information processing device 1, a printing device 2, and a mail server 3. In the first embodiment, the information processing device 1 corresponds to an electronic device according to the present disclosure. Note that the printing device 2 in the first embodiment is a multifunction peripheral. However, the printing device 2 is not limited to the multifunction peripheral, and is only required to be a device capable of performing data communication with the information processing device 1 and printing an image on a recording medium such as paper based on data transmitted from the information processing device 1. For example, the printing device 2 may be a printer or a facsimile machine.

Figure 2:
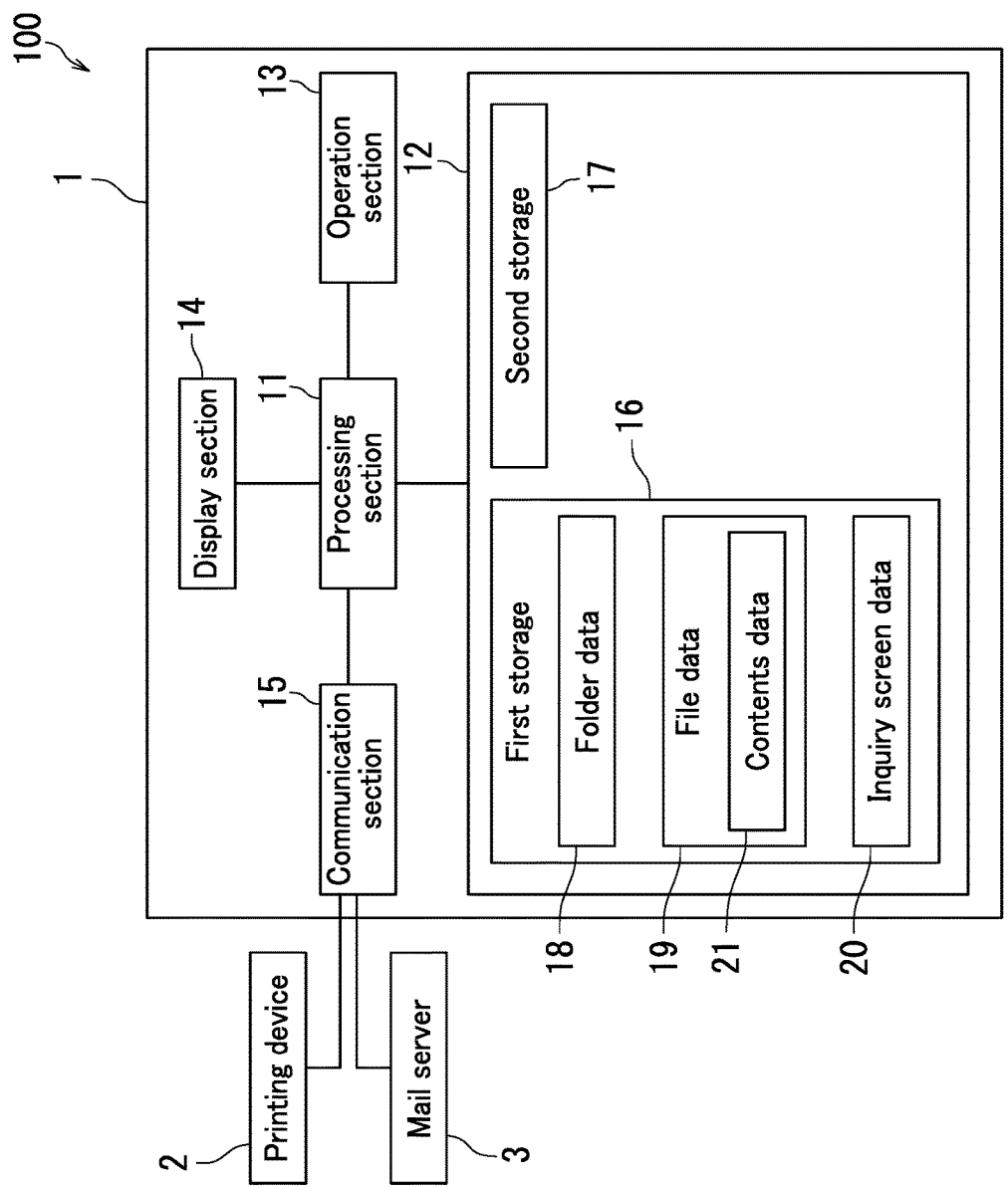
FIG. 2 is a block diagram illustrating a configuration of an information processing device according to the first embodiment of the present disclosure.

FIG. 2 is a block diagram illustrating a configuration of the information processing device 1 according to the first embodiment. As illustrated in FIG. 2, the information processing device 1 includes a processing section 11, storage 12, an operation section 13, a display section 14, and a communication section 15. Note that in the first embodiment, the information processing device 1 is a notebook personal computer (laptop computer, see FIG. 1). The notebook personal computer is an example of a user terminal used by a user. However, the information processing device 1 is not limited to the notebook personal computer, and is only required to be a device capable of performing data communication with the printing device 2 and the mail server 3 and processing information such as file data. For example, the information processing device 1 may be a user terminal such as a desktop personal computer, a tablet terminal, or a smartphone.

The processing section 11 includes a processor such as a central processing unit (CPU). Alternatively, the processing section 11 may be a CPU, for example. The processing section 11 performs various processing such as numerical calculation, information processing, and machine control through execution of programs stored in the storage 12. The machine control refers to operation control on respective sections of the information processing device 1.

The storage 12 includes memory such as a read only memory (ROM) device and a random access memory (RAM) device. Further, the storage 12 includes a storage device (auxiliary storage device) such as a hard disk drive (HDD) or a solid state drive (SSD).

The ROM device typically stores therein firmware. The firmware is software for controlling a computer system (hardware) installed in the information processing device 1 (electronic device). The RAM device typically stores therein an operating system (OS). Also, the RAM device serves as a working area of the processor. The storage device typically stores therein application programs, setting values, and the like. The storage device also stores therein various images (image data) to be displayed on the display section 14. The image data includes image data of an operation screen. The image data of the operation screen includes image data of a layout image and the like. The operation screen is for example a dialogue box screen through which various information can be entered.

The storage 12 in the first embodiment includes first storage 16 and second storage 17. The first storage 16 is typically constituted by an HDD or an SSD. The second storage 17 is typically constituted by a RAM device. For example, the second storage 17 may be constituted by a synchronous dynamic random access memory (SDRAM) device, which is a type of RAM device. Therefore, the second storage 17 typically has smaller capacity than the first storage 16 and a higher access speed than the first storage 16. For the above reasons, the second storage 17 can be used as cache memory or buffer memory.

The first storage 16 in the first embodiment stores therein folder data 18, file data 19, and inquiry screen data 20. The folder data 18 includes data for displaying a folder screen and receiving an input operation performed on the folder screen. The folder data 18 also includes information for identifying the file data 19 stored in a folder. The folder data 18 causes a file image of a file associated with the folder data 18 to be displayed on the folder screen. The file data 19 includes contents data 21 that can be printed. The contents data 21 is for example text data. The inquiry screen data 20 includes data for displaying an inquiry screen and receiving an input operation performed on the inquiry screen.

When the operation section 13 receives an instruction for erasing the file data 19, the second storage 17 stores the file data 19. Specifically, when the operation section 13 receives the instruction for erasing the file data 19, the processing section 11 transfers the file data 19 from the first storage 16 to the second storage 17. As a result, the file data 19 is erased from the first storage 16. Also, the processing section 11 updates the folder data 18 upon erasure of the file data 19 from the first storage 16.

The operation section 13 may include an input device such as a keyboard or a pointing device. For example, the operation section 13 may include a mouse and an operation pad as pointing devices. The operation section 13 receives an instruction from a user. The display section 14 includes a display such as a liquid crystal display or an organic electroluminescence (EL) display. The display section 14 displays various images and various screens under control by the processing section 11. For example, the processing section 11 causes the display section 14 to display the inquiry screen based on the inquiry screen data 20.

Note that the information processing device 1 may include a touch display. Specifically, the touch display includes a display and a touch sensor. The touch sensor is superposed on a display surface of the display. In a configuration in which the information processing device 1 includes the touch display, the operation section 13 includes the touch sensor of the touch display and the display section 14 includes the display of the touch display. Alternatively, the operation section 13 includes an input device such as a keyboard or a pointing device as well as the touch sensor of the touch display.

The communication section 15 is for example a communication interface. In a configuration in which the communication section 15 is the communication interface, the communication section 15 may include a connector connected to a network cable. The communication section 15 is connected to the printing device 2 and receives data transmitted therefrom. The communication section 15 is connected to the printing device 2 for example via a local area network (LAN). Also, the information processing device 1 (processing section 11) transmits data to the printing device 2 through the communication section 15. Specifically, the processing section 11 transmits image data to the printing device 2 through the communication section 15 and requests the printing device 2 to execute printing based on the transmitted image data. The printing device 2 generates a print job based on the data received from the information processing device 1. Then, the printing device 2 prints on a recording medium such as paper an image corresponding to the image data received from the information processing device 1 based on the generated print job. Note that the processing section 11 may generate the print job. In a configuration in which the processing section 11 generates the print job, the printing device 2 prints the image on the recording medium based on the print job received from the information processing device 1.

The communication section 15 is further connected to the mail server 3. The communication section 15 receives an email transmitted from the mail server 3. The communication section 15 is connected to the mail server 3 for example via a public network such as the Internet. Also, the information processing device 1 (processing section 11) transmits an email to the mail server 3 through the communication section 15.

Figure 3:
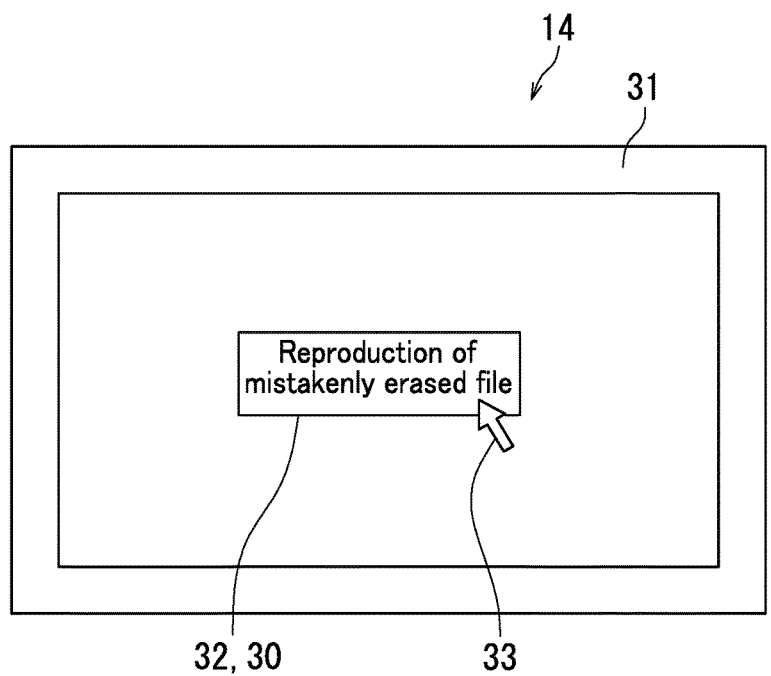
FIG. 3 is a diagram illustrating an inquiry screen according to the first embodiment of the present disclosure.

FIG. 3 is a diagram illustrating an inquiry screen 30 according to the first embodiment. As illustrated in FIG. 3, the display section 14 includes a display 31 that displays the inquiry screen 30. The inquiry screen 30 in the first embodiment includes a button 32 (button image) for giving an instruction for reproducing a mistakenly erased file. In the following description, the button 32 will be referred to as a reproduction button 32. When the file data 19 is transferred from the first storage 16 to the second storage 17 as described with reference to FIG. 2, the display section 14 displays the reproduction button 32 (inquiry screen 30).

While the inquiry screen 30 is displayed, the operation section 13 described with reference to FIG. 2 is enabled to receive an instruction for reproducing a file erased from the first storage 16. In the first embodiment, the user can give an instruction for file reproduction by pressing the reproduction button 32 through an operation on the operation section 13. Upon detecting the reproduction button 32 being pressed, the processing section 11 executes contents reproduction processing (contents restoration processing). For example, the display section 14 (display 31) displays a pointer 33 (pointer image). The user overlaps the pointer 33 on the reproduction button 32 through an operation on a pointing device, and then performs a click operation. In response, the processing section 11 detects the reproduction button 32 being pressed and executes the contents reproduction processing.

Figure 4:
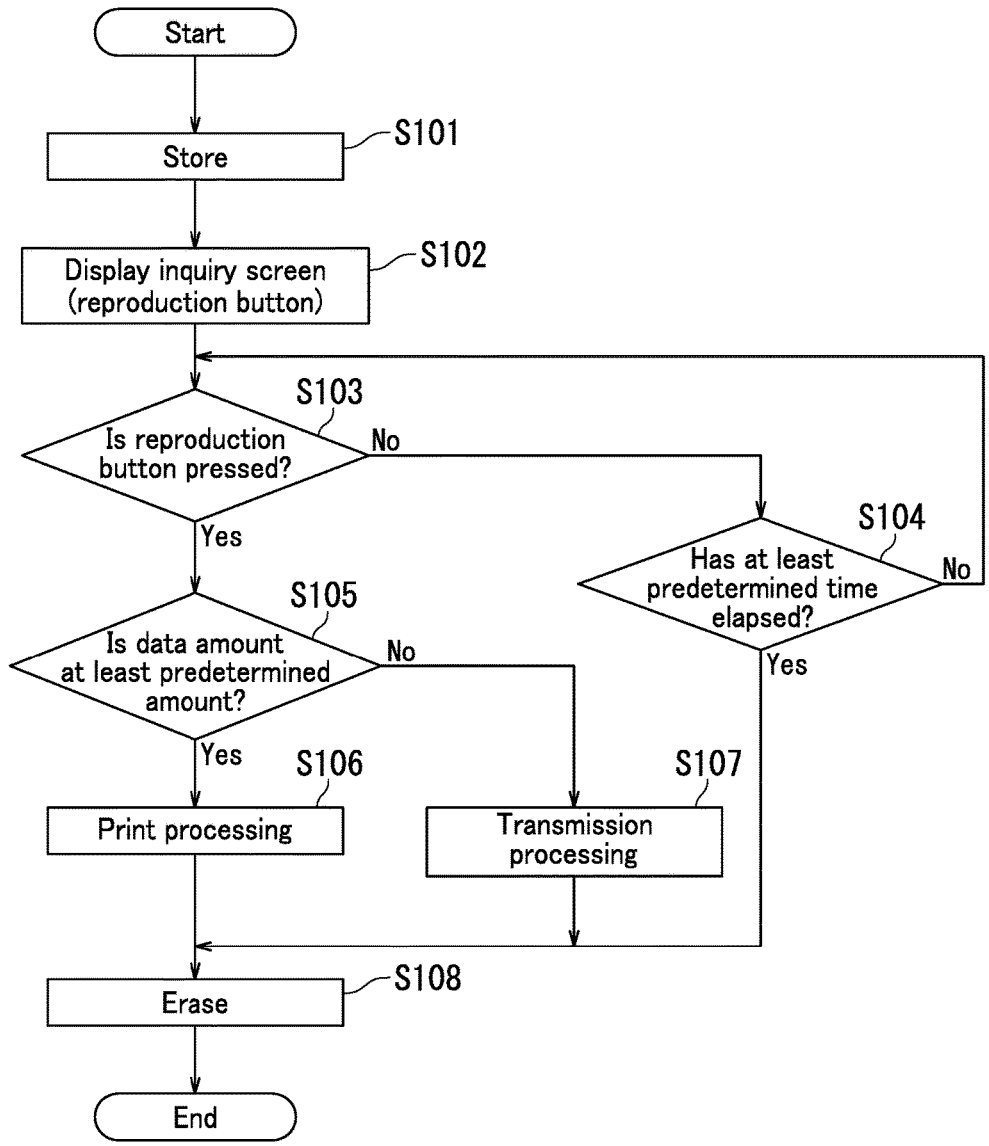
FIG. 4 is a flowchart illustrating operation of the information processing device according to the first embodiment of the present disclosure.

The following describes operation of the information processing device 1 (processing performed by the processing section 11) according to the first embodiment with reference to FIGS. 1 to 4. FIG. 4 is a flowchart illustrating the operation of the information processing device 1 (processing performed by the processing section 11) according to the first embodiment. The contents reproduction processing according to the first embodiment includes print processing (Step S106) and transmission processing (Step S107).

The processing illustrated in FIG. 4 (operation of the information processing device 1) starts when the operation section 13 receives an instruction for erasing the file data 19. When the operation section 13 receives the instruction for erasing the file data 19, the processing section 11 initially reads the file data 19 that is an erasure target from the first storage 16. As a result, the erasure target file data 19 is erased from the first storage 16. Then, the processing section 11 stores in the second storage 17 the erasure target file data 19 read from the first storage 16 (Step S101).

After storing the erasure target file data 19 in the second storage 17, the processing section 11 causes the display section 14 to display the inquiry screen 30 (reproduction button 32) (Step S102). Also, when the display section 14 displays the inquiry screen 30, the processing section 11 starts time measurement processing. For example, the processing section 11 has a timer function that starts to measure time when the display section 14 displays the inquiry screen 30.

Note that the inquiry screen 30 is preferably displayed at a position different from a position where a folder screen for which erasure of the file data 19 has been instructed is displayed. In a configuration in which the inquiry screen 30 is displayed at a position different from a position where the folder screen is displayed, a situation can be prevented in which the user unintentionally presses the reproduction button 32. Also, the inquiry screen 30 may be displayed after elapse of a specific time from when the operation section 13 receives the instruction for erasing the file data 19. In a configuration in which display of the inquiry screen 30 is delayed, a situation can be prevented in which the user unintentionally presses the reproduction button 32.

When the display section 14 displays the inquiry screen 30, the processing section 11 determines whether or not the reproduction button 32 is pressed (Step S103). When determining that the reproduction button 32 is not pressed (No at Step S103), the processing section 11 determines whether or not at least a predetermined time has elapsed from when the inquiry screen 30 is displayed by the display section 14 (Step S104). The predetermined time (threshold value) is stored in the first storage 16 in advance. For example, the processing section 11 determines whether or not a count value of a timer has reached a predetermined value. In the following description, a time elapsed from the start of display of the inquiry screen 30 may be referred to as an elapsed time. Upon determining that the elapsed time is shorter than the predetermined time (No at Step S104), the processing section 11 returns to Step S103. The predetermined time is for example two minutes. Note that the predetermined time may be a setting value that can be set by the user through the operation section 13.

When determining that the reproduction button 32 is pressed (Yes at Step S103), the processing section 11 closes the inquiry screen 30 (deletes the inquiry screen 30 from a display screen) and determines whether or not a data amount of the contents data 21 included in the erasure target file data 19 is at least a predetermined amount (Step S105). The predetermined amount (threshold value) is stored in the first storage 16 in advance. In the following description, the contents data 21 included in the erasure target file data 19 may be referred to as erasure target contents data 21. The predetermined amount is for example 10 megabytes (MB). Note that the predetermined amount may be a setting value that can be set by the user through the operation section 13.

When determining that the data amount of the erasure target contents data 21 is at least the predetermined amount (Yes at Step S105), the processing section 11 executes the print processing (Step S106). The print processing executed by the processing section 11 is processing for causing the printing device 2 to print contents of the erasure target file data 19. When determining that the data amount of the erasure target contents data 21 is less than the predetermined amount (No at Step S105), the processing section 11 executes the transmission processing (Step S107). The transmission processing executed by the processing section 11 is processing for transmitting the erasure target file data 19 as an attachment to a self-destined email (email addressed to the information processing device 1).

After executing the print processing or the transmission processing, the processing section 11 erases the erasure target file data 19 from the second storage 17 (Step S108). The processing illustrated in FIG. 4 ends upon erasure of the erasure target file data 19 from the second storage 17. Alternatively, when determining that the elapsed time is equal to or longer than the predetermined time (Yes at Step S104), the processing section 11 closes the inquiry screen 30 and erases the erasure target file data 19 from the second storage 17 (Step S108). The processing illustrated in FIG. 4 ends then.

Figure 5:
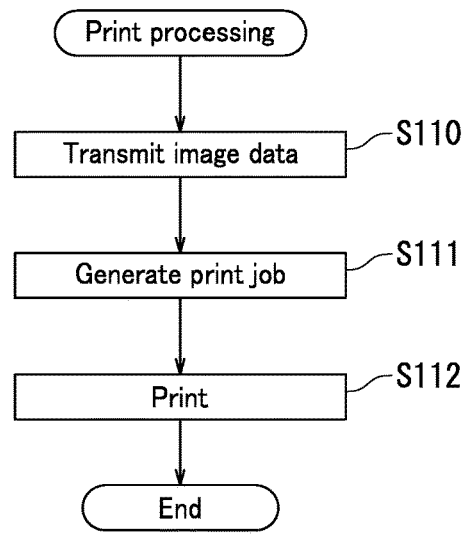
FIG. 5 is a flowchart illustrating print processing according to the first embodiment of the present disclosure.

The following describes the print processing according to the first embodiment with reference to FIGS. 1 to 5. FIG. 5 is a flowchart illustrating the print processing according to the first embodiment. The print processing according to the first embodiment starts when the data amount of the erasure target contents data 21 is at least the predetermined amount (Yes at Step S105 in FIG. 4). The print processing according to the first embodiment is executed through cooperation between the information processing device 1 and the printing device 2.

As illustrated in FIG. 5, the processing section 11 of the information processing device 1 initially transmits image data corresponding to the erasure target contents data 21 to the printing device 2 through the communication section 15 and requests the printing device 2 to execute printing based on the transmitted image data (Step S110). In response, the printing device 2 generates a print job based on the data received from the information processing device 1 (Step S111). Next, the printing device 2 prints on a recording medium such as paper an image corresponding to the image data received from the information processing device 1 based on the print job (Step S112). The print processing illustrated in FIG. 5 ends upon execution of printing by the printing device 2.

Figure 6:
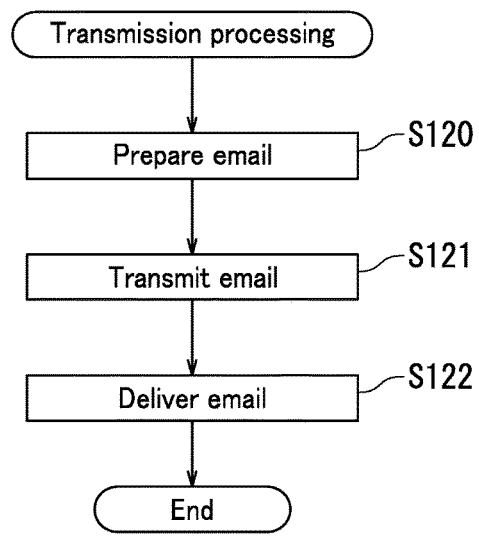
FIG. 6 is a flowchart illustrating transmission processing according to the first embodiment of the present disclosure.

The following describes the transmission processing according to the first embodiment with reference to FIGS. 1 to 4 and 6. FIG. 6 is a flowchart illustrating the transmission processing according to the first embodiment. The transmission processing according to the first embodiment starts when the data amount of the erasure target contents data 21 is less than the predetermined amount (No at Step S105 in FIG. 4). The transmission processing according to the first embodiment is executed through cooperation between the information processing device 1 and the mail server 3.

As illustrated in FIG. 6, the processing section 11 of the information processing device 1 initially drafts a self-destined email (email addressed to the information processing device 1) with the erasure target file data 19 attached thereto (Step S120). Next, the processing section 11 of the information processing device 1 transmits the email to the mail server 3 through the communication section 15 (Step S121). The mail server 3 delivers the email received from the information processing device 1 to an address described in the email (Step S122). As a result, the information processing device 1 acquires the email including as an attachment the file data 19 erased from the storage 12. The transmission processing illustrated in FIG. 6 ends upon delivery of the email by the mail server 3.

Through the above, the first embodiment has been described. According to the first embodiment, even when a necessary file has been erased by an erroneous operation by the user (i.e., the file has been erased by mistake), the user can acquire contents of the erased file. Specifically, in a situation in which a data amount of the contents erased from the information processing device 1 (electronic device) is at least the predetermined amount, the user can acquire printed matter on which the contents erased from the information processing device 1 (electronic device) are printed. In a situation in which the data amount of the contents erased from the information processing device 1 (electronic device) is less than the predetermined amount, the user can acquire an email with the contents attached thereto.

Also, according to the first embodiment, in a situation in which the data amount of the contents erased from the information processing device 1 (electronic device) is less than the predetermined amount, the email with the contents attached thereto is transmitted. Thus, the email is transmitted to the mail server 3 in a situation in which the data amount of the file data 19 is relatively small. Therefore, it is possible to reduce a possibility that available capacity of a storage area of the mail server 3 allocated to the user of the information processing device 1 runs short.

Also, according to the first embodiment, the inquiry screen 30 (reproduction button 32) disappears from the display screen when the predetermined time elapses from when the inquiry screen 30 (reproduction button 32) is displayed. Therefore, the user is not required to perform any operation in a situation in which the user has erased the file intentionally.

Note that the first storage 16 may store a plurality of files therein. Also, the first storage 16 may store a plurality of folders therein.

Second Embodiment

The following describes a second embodiment of the present disclosure with reference to FIGS. 1, 2, and 5 to 8. However, description of the same matter as the first embodiment will be omitted and only matter different from the first embodiment will be described. The inquiry screen 30 in the second embodiment differs from that in the first embodiment.

Figure 7:
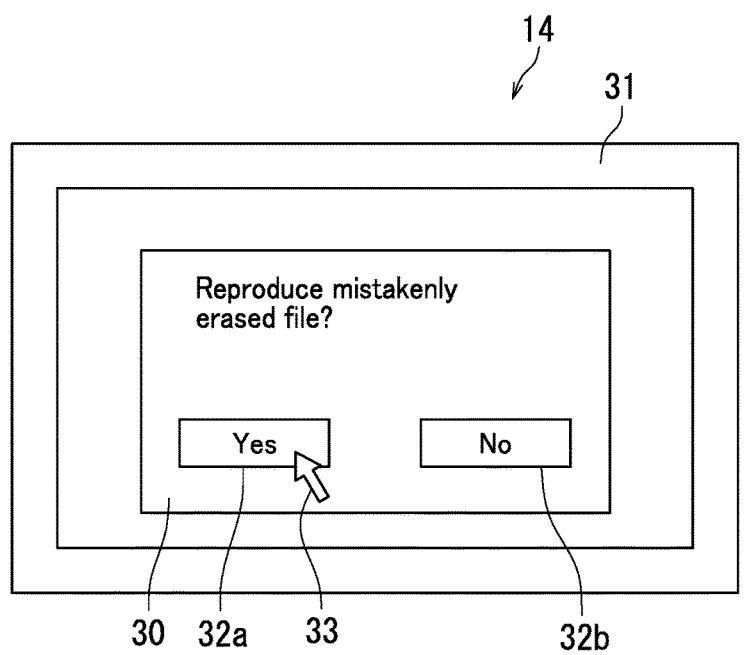
FIG. 7 is a diagram illustrating an inquiry screen according to a second embodiment of the present disclosure.

FIG. 7 is a diagram illustrating the inquiry screen 30 according to the second embodiment. As illustrated in FIG. 7, the inquiry screen 30 according to the second embodiment includes a "Yes" button 32a (button image) and a "No"

button 32b (button image). The "Yes" button 32a is a button for giving an instruction for reproducing a mistakenly erased file and the "No" button 32b is a button for closing the inquiry screen 30.

In the second embodiment, the user can give an instruction for file reproduction by pressing the "Yes" button 32a through an operation on the operation section 13. Upon detecting the "Yes" button 32a being pressed, the processing section 11 executes the contents reproduction processing (contents restoration processing). For example, the user overlaps the pointer 33 on the "Yes" button 32a through an operation on a pointing device, and then performs a click operation. In response, the processing section 11 detects the "Yes" button 32a being pressed and executes the contents reproduction processing. Also, the user can close the inquiry screen 30 by pressing the "No" button 32b through an operation on the operation section 13. Upon detecting the "No" button 32b being pressed, the processing section 11 closes the inquiry screen 30. In other words, the inquiry screen 30 is deleted from the display screen.

Figure 8:
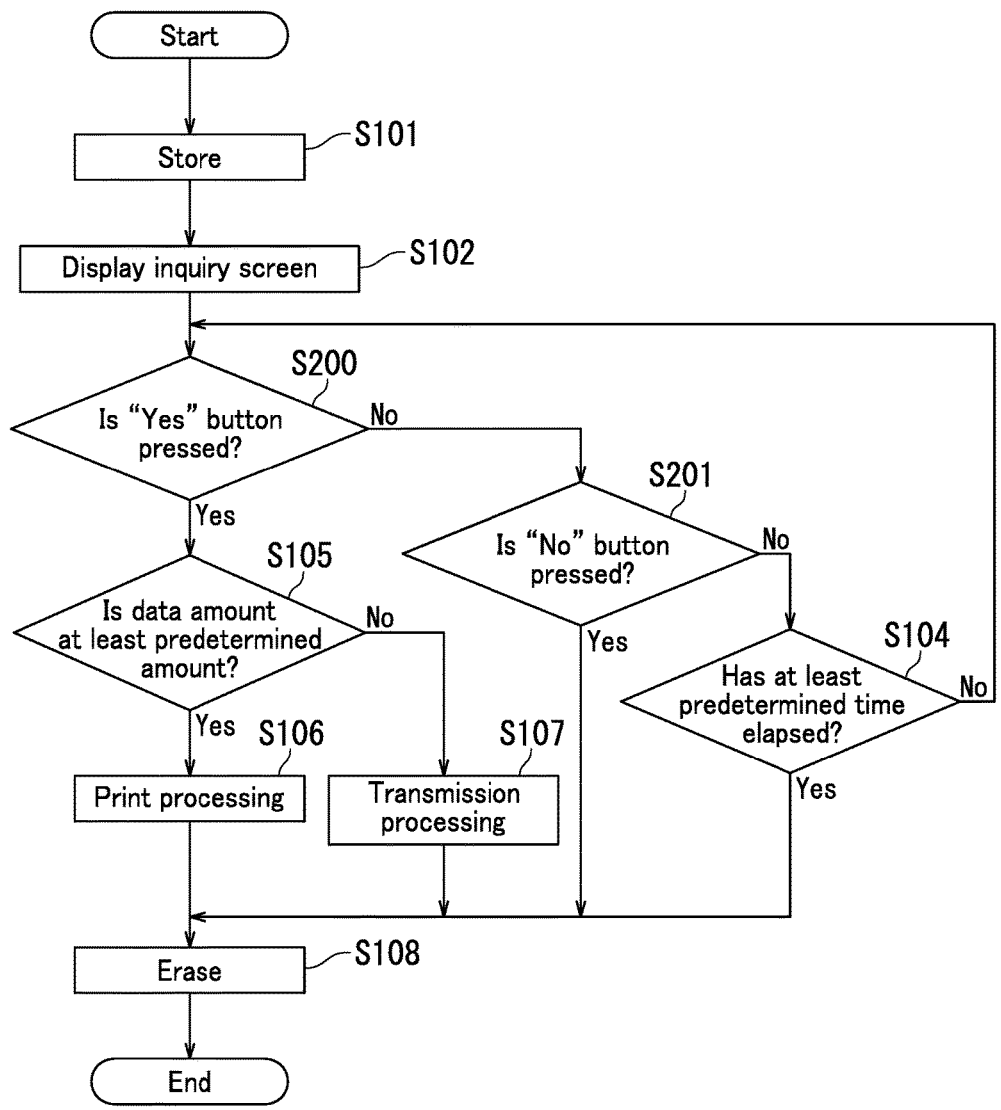
FIG. 8 is a flowchart illustrating operation of an information processing device according to the second embodiment of the present disclosure.

The following describes operation of the information processing device 1 (processing performed by the processing section 11) according to the second embodiment. FIG. 8 is a flowchart illustrating the operation of the information processing device 1 (processing performed by the processing section 11) according to the second embodiment. As illustrated in FIG. 8, the processing performed by the processing section 11 according to the second embodiment includes Steps S200 and S201 instead of Step S103 in FIG. 4.

After storing the erasure target file data 19 in the second storage 17 (Step S101), the processing section 11 causes the display section 14 to display the inquiry screen 30 illustrated in FIG. 7 (Step S102). Also, when the display section 14 displays the inquiry screen 30, the processing section 11 starts the time measurement processing.

When the display section 14 displays the inquiry screen 30, the processing section 11 determines whether or not the "Yes" button 32a is pressed (Step S200). When determining that the "Yes" button 32a is pressed (Yes at Step S200), the processing section 11 proceeds to Step S105. By contrast, when determining that the "Yes" button 32a is not pressed (No at Step S200), the processing section 11 determines whether or not the "No" button 32b is pressed (Step S201).

When determining that the "No" button 32b is pressed (Yes at Step S201), the processing section 11 closes the inquiry screen 30 and proceeds to Step S108. By contrast, when determining that the "No" button 32b is not pressed (No at Step S201), the processing section 11 proceeds to Step S104.

Through the above, the second embodiment has been described. According to the second embodiment, the user can close the inquiry screen 30 before the predetermined time elapses from when the inquiry screen 30 is displayed. Thus, convenience is improved. Note that according to the second embodiment, the inquiry screen 30 is closed in response to the "No" button 32b being pressed. Therefore, Step S104 in FIG. 8 can be omitted. In a configuration in which Step S104 is omitted, the processing section 11 returns to Step S200 when determining that the "No" button 32b is not pressed (No at Step S201).

Third Embodiment

The following describes a third embodiment of the present disclosure with reference to FIGS. 1, 2, 5, 6, 9, and 10. However, description of the same matter as the first and second embodiments will be omitted and only matter different from the first and second embodiments will be described. The inquiry screen 30 in the third embodiment differs from those in the first and second embodiments.

Figure 9:
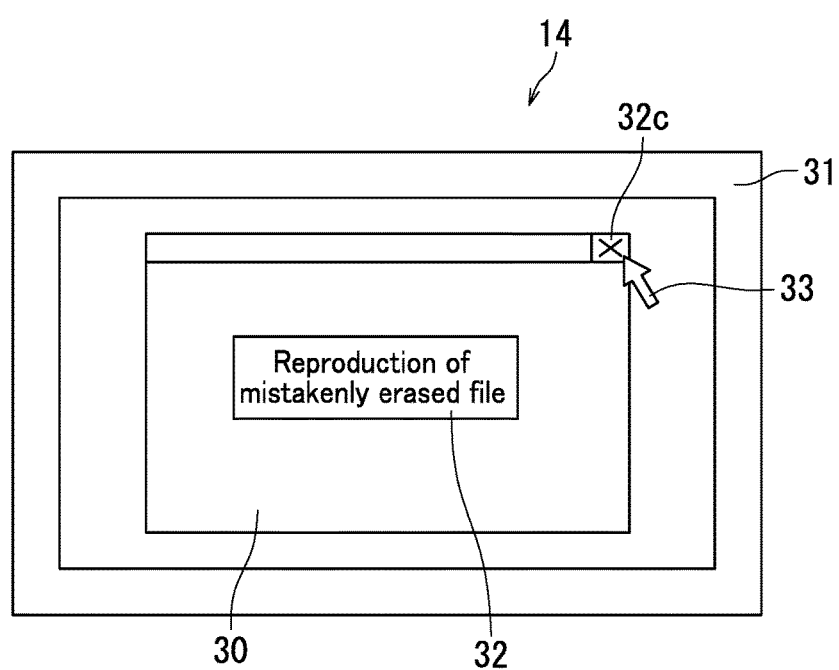
FIG. 9 is a diagram illustrating an inquiry screen according to a third embodiment of the present disclosure.

FIG. 9 is a diagram illustrating the inquiry screen 30 according to the third embodiment. As illustrated in FIG. 9, the inquiry screen 30 according to the third embodiment includes the reproduction button 32 and a "close" button 32c (button image). The "close" button 32c is a button for closing the inquiry screen 30.

In the third embodiment, the user can close the inquiry screen 30 by pressing the "close" button 32c through an operation on the operation section 13. Upon detecting the "close" button 32c being pressed, the processing section 11 closes the inquiry screen 30.

Figure 10:
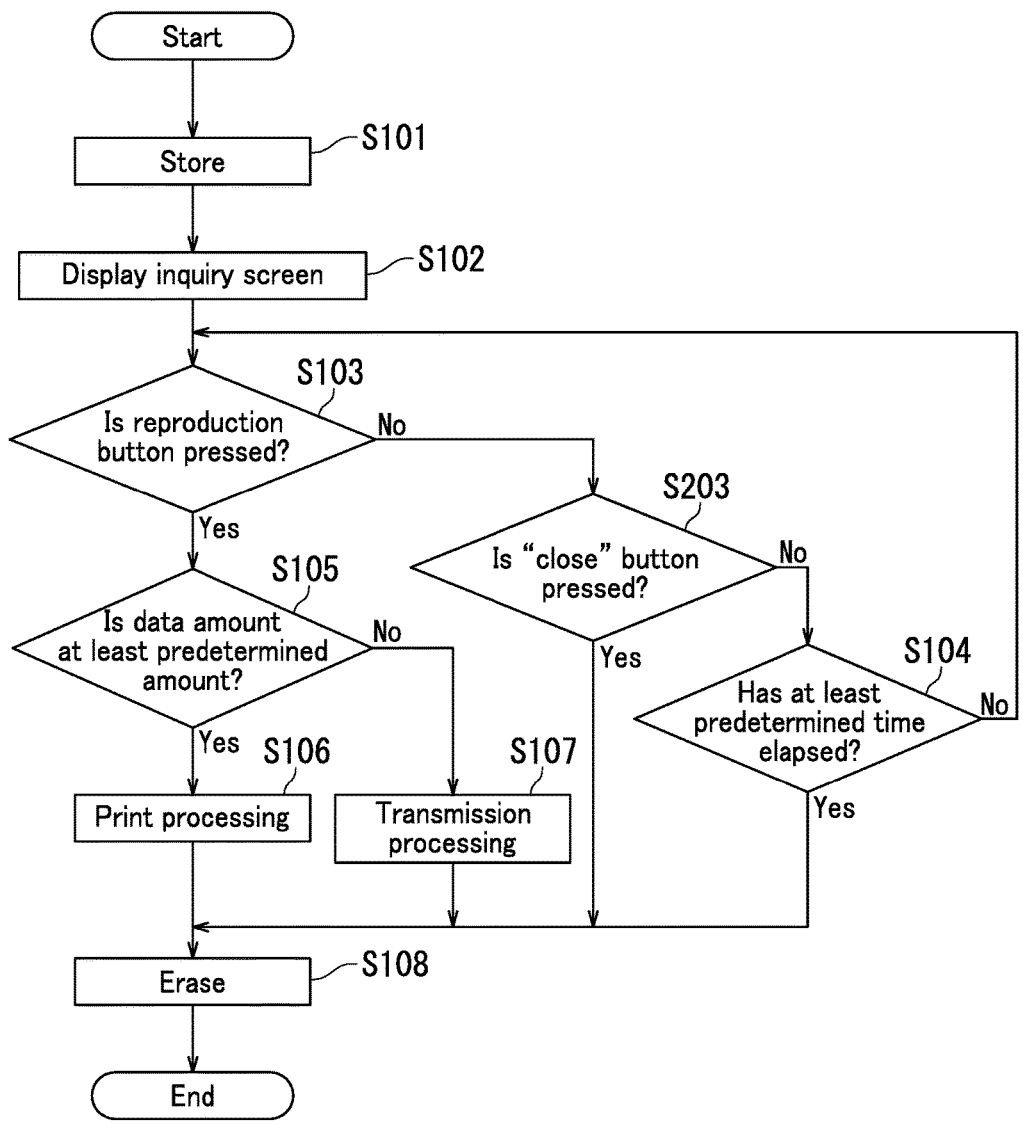
FIG. 10 is a flowchart illustrating operation of an information processing device according to the third embodiment of the present disclosure.

The following describes operation of the information processing device 1 (processing performed by the processing section 11) according to the third embodiment. FIG. 10 is a flowchart illustrating the operation of the information processing device 1 (processing performed by the processing section 11) according to the third embodiment. As illustrated in FIG. 10, the processing performed by the processing section 11 according to the third embodiment includes Step S203 in addition to the processing illustrated in FIG. 4.

When determining that the reproduction button 32 is not pressed while the inquiry screen 30 is displayed (No at Step S103), the processing section 11 determines whether or not the "close" button 32c is pressed (Step S203).

When determining that the "close" button 32c is pressed (Yes at Step S203), the processing section 11 closes the inquiry screen 30 and proceeds to Step S108. By contrast, when determining that the "close" button 32c is not pressed (No at Step S203), the processing section 11 proceeds to Step S104.

Through the above, the third embodiment has been described. According to the third embodiment, the user can close the inquiry screen 30 before the predetermined time elapses from when the inquiry screen 30 is displayed. Thus, convenience is improved. Note that according to the third embodiment, the inquiry screen 30 is closed in response to the "close" button 32c being pressed. Therefore, Step S104 in FIG. 10 can be omitted. In a configuration in which Step S104 is omitted, the processing section 11 returns to Step S103 when determining that the "close" button 32c is not pressed (No at Step S203).

Fourth Embodiment

The following describes a fourth embodiment of the present disclosure with reference to FIGS. 1 to 3, 5, 6, and 11. However, description of the same matter as the first through third embodiments will be omitted and only matter different from the first through third embodiments will be described. Operation of the information processing device 1 (processing performed by the processing section 11) in the fourth embodiment differs from that in the first through third embodiments.

Figure 11:
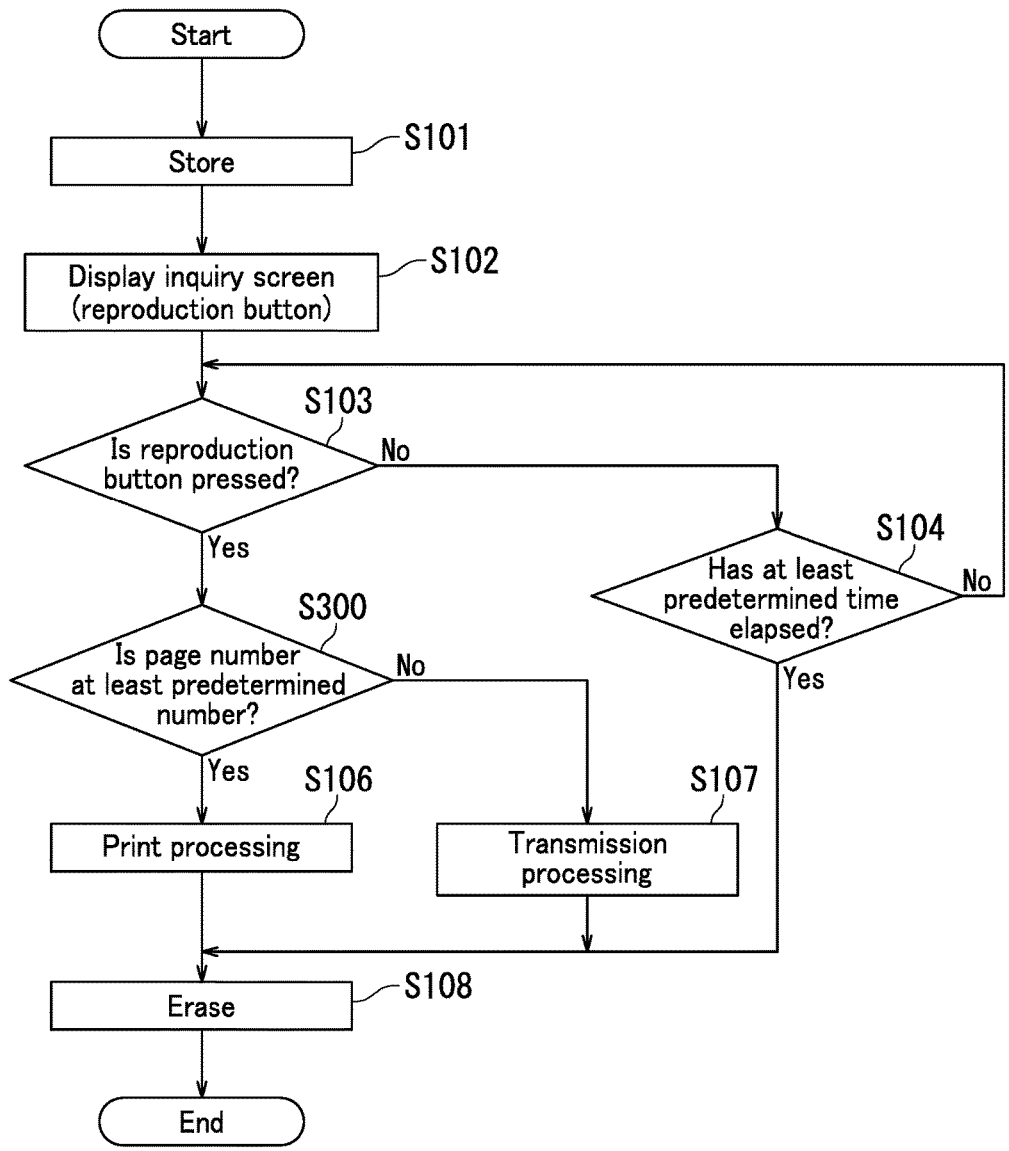
FIG. 11 is a flowchart illustrating operation of an information processing device according to a fourth embodiment of the present disclosure.

FIG. 11 is a flowchart illustrating the operation of the information processing device 1 (processing performed by the processing section 11) according to the fourth embodiment. As illustrated in FIG. 11, the processing performed by the processing section 11 according to the fourth embodiment includes Step S300 instead of Step S105 in FIG. 4.

When determining that the reproduction button 32 is pressed while the inquiry screen 30 is displayed (Yes at Step S103), the processing section 11 closes the inquiry screen 30 and determines whether or not the number of pages of the erasure target contents is at least a predetermined number (Step S300). The predetermined number (threshold value) is stored in the first storage 16 in advance. The predetermined number is for example 100. Note that the predetermined number may be a setting value that can be set by the user through the operation section 13.

When determining that the number of pages of the erasure target contents is at least the predetermined number (Yes at Step S300), the processing section 11 executes the print processing (Step S106). When determining that the number of pages of the erasure target contents is smaller than the predetermined number (No at Step S300), the processing section 11 executes the transmission processing (Step S107).

Through the above, the fourth embodiment has been described. According to the fourth embodiment, the email with the contents data 21 erased from the information processing device 1 (electronic device) attached thereto is transmitted in a situation in which the number of pages of the erasure target contents is smaller than the predetermined number. Thus, the email is transmitted to the mail server 3 in a situation in which the data amount of the file data 19 is relatively small. Therefore, it is possible to reduce a possibility that available capacity of a storage area of the mail server 3 allocated to the user of the information processing device 1 runs short.

Fifth Embodiment

The following describes a fifth embodiment of the present disclosure with reference to FIGS. 1 to 3, 5, 6, and 12. However, description of the same matter as the first through fourth embodiments will be omitted and only matter different from the first through fourth embodiments will be described. Operation of the information processing device 1 (processing performed by the processing section 11) in the fifth embodiment differs from that in the first through fourth embodiments.

Figure 12:
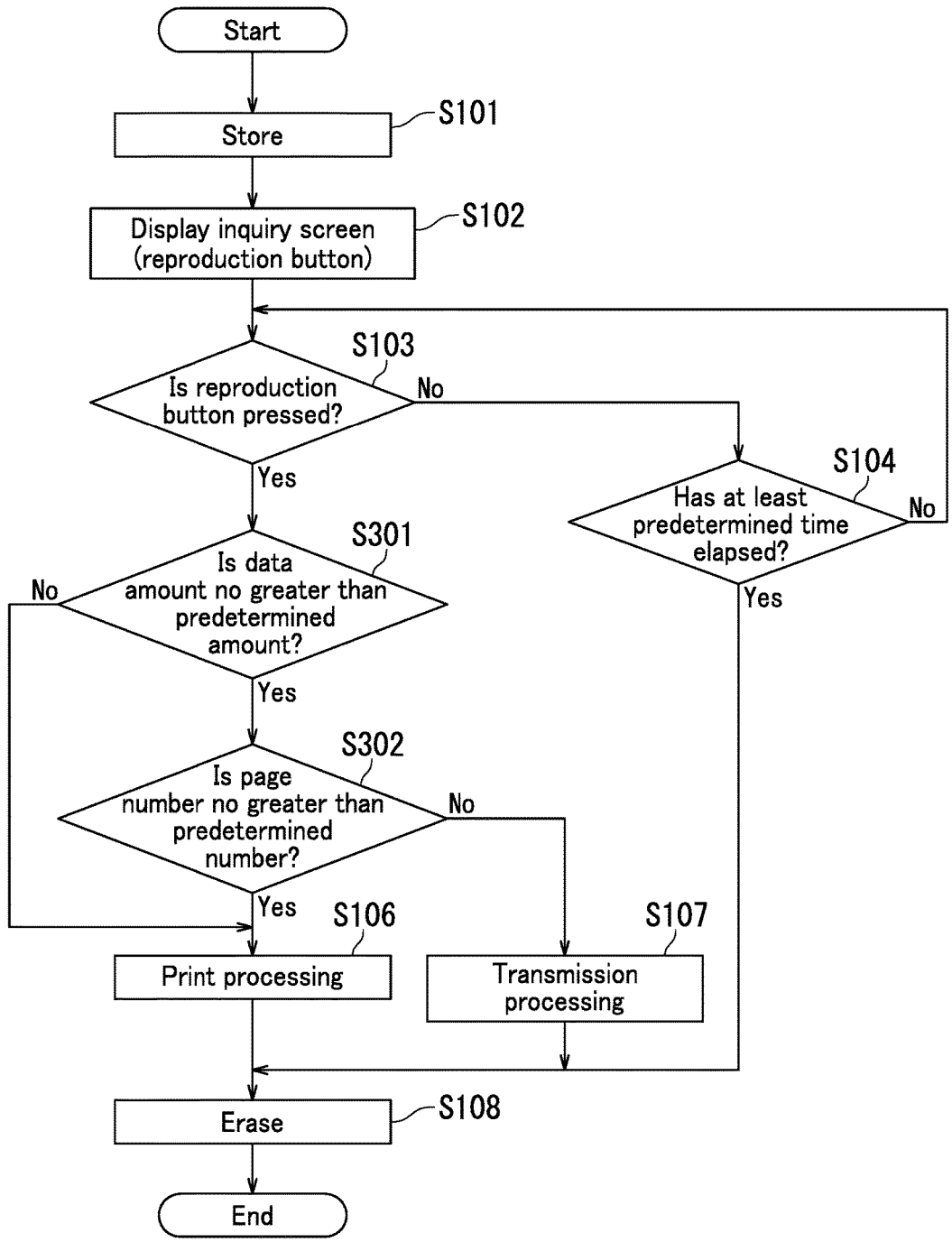
FIG. 12 is a flowchart illustrating operation of an information processing device according to a fifth embodiment of the present disclosure.

FIG. 12 is a flowchart illustrating the operation of the information processing device 1 (processing performed by the processing section 11) according to the fifth embodiment. As illustrated in FIG. 12, the processing performed by the processing section 11 according to the fifth embodiment includes Steps S301 and S302 instead of Step S105 in FIG. 4.

When determining that the reproduction button 32 is pressed while the inquiry screen 30 is displayed (Yes at Step S103), the processing section 11 closes the inquiry screen 30 and determines whether or not the data amount of the erasure target contents data 21 is no greater than a predetermined amount (Step S301). The predetermined amount (threshold value) is stored in the first storage 16 in advance. The predetermined amount is for example 10 MB. Note that the predetermined amount may be a setting value that can be set by the user through the operation section 13.

When determining that the data amount of the erasure target contents data 21 is greater than the predetermined amount (No at Step S301), the processing section 11 executes the print processing (Step S106). By contrast, when determining that the data amount of the erasure target contents data 21 is no greater than the predetermined amount (Yes at Step S301), the processing section 11 determines whether or not the number of pages of the erasure target contents is no greater than a predetermined number (Step S302). The predetermined number (threshold value) is stored in the first storage 16 in advance. The predetermined number is for example 100. Note that the predetermined number may be a setting value that can be set by the user through the operation section 13.

When determining that the number of pages of the erasure target contents is no greater than the predetermined number (Yes at Step S302), the processing section 11 executes the print processing (Step S106). By contrast, when determining that the number of pages of the erasure target contents is greater than the predetermined number (No at Step S302), the processing section 11 executes the transmission processing (Step S107).

Through the above, the fifth embodiment has been described. According to the fifth embodiment, printing is executed in a situation in which the data amount of the erasure target contents is greater than the predetermined amount. Therefore, it is possible to reduce a possibility that available capacity of a storage area of the mail server 3 allocated to the user of the information processing device 1 runs short. Further, according to the fifth embodiment, printing is executed even in a situation in which the data amount of the erasure target contents is no greater than the predetermined amount as long as the number of pages of the erasure target contents is no greater than the predetermined number. Through the above, consumption of the recording medium such as paper can be reduced.

Sixth Embodiment

The following describes a sixth embodiment with reference to FIGS. 1 to 3, 5, 6, and 13. However, description of the same matter as the first through fifth embodiments will be omitted and only matter different from the first through fifth embodiments will be described. Operation of the information processing device 1 (processing performed by the processing section 11) in the sixth embodiment differs from that in the first through fifth embodiments.

Figure 13:
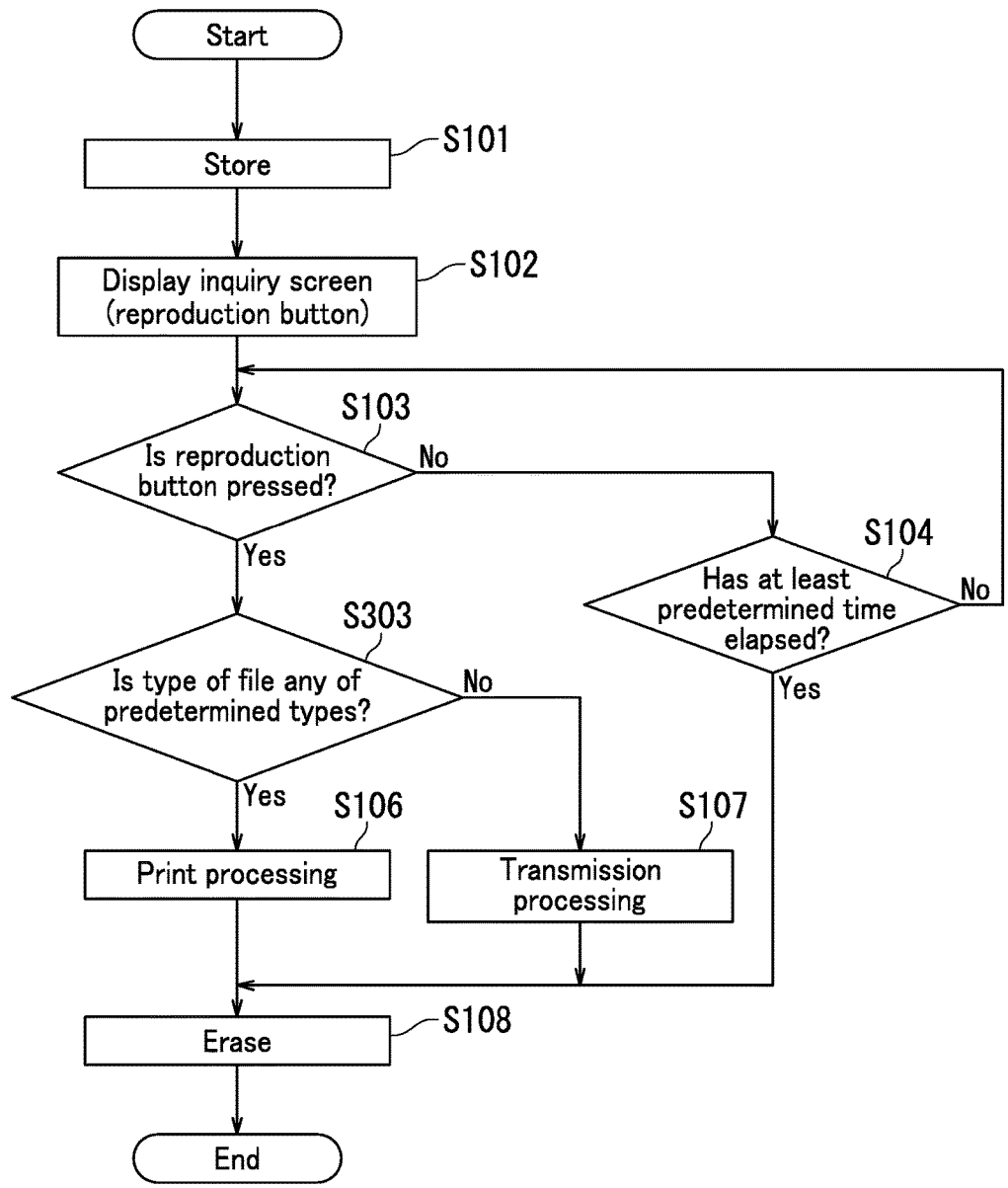
FIG. 13 is a flowchart illustrating operation of an information processing device according to a sixth embodiment of the present disclosure.

FIG. 13 is a flowchart illustrating the operation of the information processing device 1 (processing performed by the processing section 11) according to the sixth embodiment. As illustrated in FIG. 13, the processing performed by the processing section 11 according to the sixth embodiment includes Step S303 instead of Step S105 in FIG. 4.

When determining that the reproduction button 32 is pressed while the inquiry screen 30 is displayed (Yes at Step S103), the processing section 11 closes the inquiry screen 30 and determines whether or not a type of the erasure target file data 19 is any one of at least one predetermined type (Step S303). Information indicating the at least one predetermined type is stored in the first storage 16 in advance. The information indicating the at least one predetermined type may be information that can be set by the user through the operation section 13. For example, the processing section 11 determines whether or not the extension of a file is any one of predetermined extensions. The predetermined extensions include for example ".pdf" and ".jpg". Although no specific limitation is placed on the predetermined extensions, it is preferable that the predetermined extensions include extensions indicating types of files that tend to have large data amounts.

When determining that the type of the erasure target file data 19 is one of the at least one predetermined type (Yes at Step S303), the processing section 11 executes the print processing (Step S106). By contrast, when determining that the type of the erasure target file data 19 is none of the at least one predetermined type (No at Step S303), the processing section 11 executes the transmission processing (Step S107).

Through the above, the sixth embodiment has been described. According to the sixth embodiment, in a situation in which the type of the erasure target file data 19 is none of the at least one predetermined type, the email with the contents data 21 erased from the information processing device 1 (electronic device) attached thereto is transmitted. Therefore, in a configuration in which the at least one predetermined type includes types of files that tend to have large data amounts, file data 19 having a relatively small data amount can be transmitted to the mail server 3 as an attachment to an email. As a result, it is possible to reduce a possibility that available capacity of a storage area of the mail server 3 allocated to the user of the information processing device 1 runs short.

Seventh Embodiment

The following describes a seventh embodiment of the present disclosure with reference to FIGS. 1 to 3 and 14. However, description of the same matter as the first through sixth embodiments will be omitted and only matter different from the first through sixth embodiments will be described. Operation of the information processing device 1 (processing performed by the processing section 11) in the seventh embodiment differs from that in the first through sixth embodiments.

Figure 14:
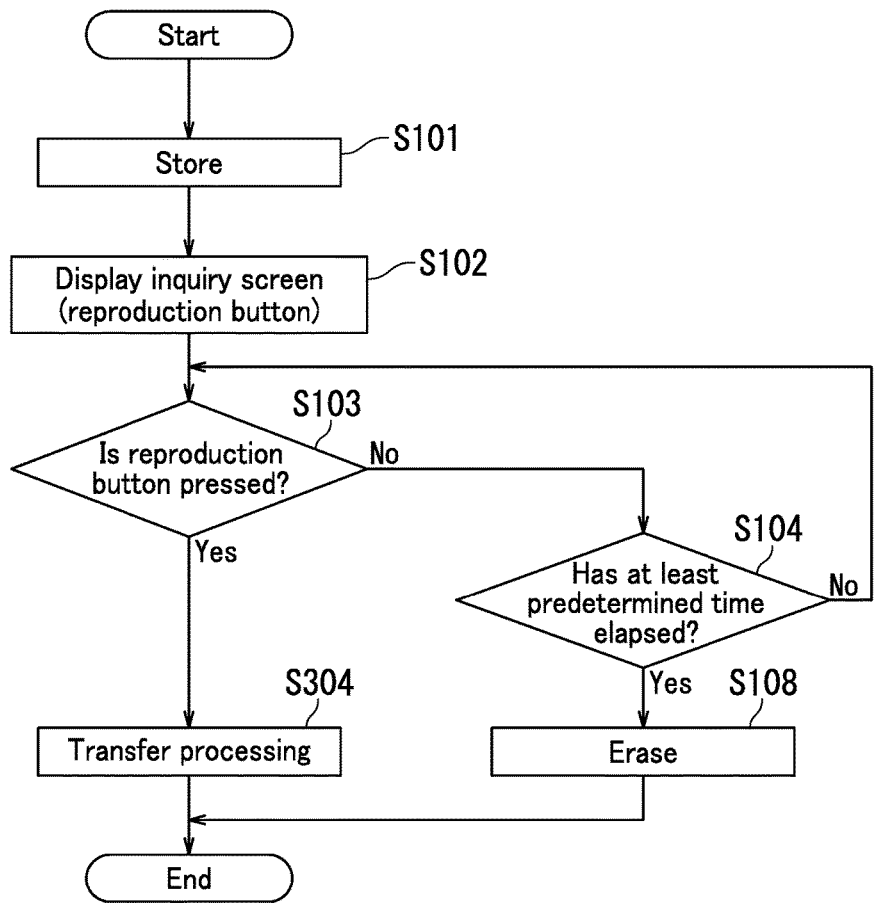
FIG. 14 is a flowchart illustrating operation of an information processing device according to a seventh embodiment of the present disclosure.

FIG. 14 is a flowchart illustrating the operation of the information processing device 1 (processing performed by the processing section 11) according to the seventh embodiment. As illustrated in FIG. 14, the contents reproduction processing according to the seventh embodiment includes transfer processing (Step S304) instead of the print processing (Step S106) and the transmission processing (Step S107) in FIG. 4.

When determining that the reproduction button 32 is pressed while the inquiry screen 30 is displayed (Yes at Step S103), the processing section 11 closes the inquiry screen 30 and transfers the erasure target file data 19 from the second storage 17 to the first storage 16 (Step S304). Specifically, the processing section 11 reads the erasure target file data 19 from the second storage 17. As a result, the erasure target file data 19 is erased from the second storage 17. Then, the processing section 11 stores in the first storage 16 the erasure target file data 19 read from the second storage 17. Also, the processing section 11 updates the folder data 18 upon the file data 19 being stored in the first storage 16. The processing illustrated in FIG. 14 ends when the erasure target file data 19 is stored in the first storage 16.

Through the above, the seventh embodiment has been described. According to the seventh embodiment, the user can return the file data 19 from the second storage 17 (cache memory or buffer memory) to the first storage 16 (storage device) by pressing the reproduction button 32.

Eighth Embodiment

The following describes an eighth embodiment with reference to FIGS. 1 to 3, 5, 6, 15, and 16. However, description of the same matter as the first through seventh embodiments will be omitted and only matter different from the first through seventh embodiments will be described. The file data 19 in the eighth embodiment differs from that in the first through seventh embodiments.

Figure 15:
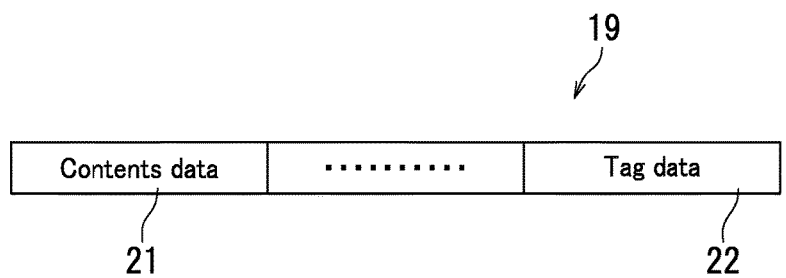
FIG. 15 is a diagram illustrating file data according to an eighth embodiment of the present disclosure.

FIG. 15 is a diagram illustrating the file data 19 according to the eighth embodiment. As illustrated in FIG. 15, the file data 19 may include tag data 22. The tag data 22 indicates that the contents data 21 is confidential information.

Figure 16:
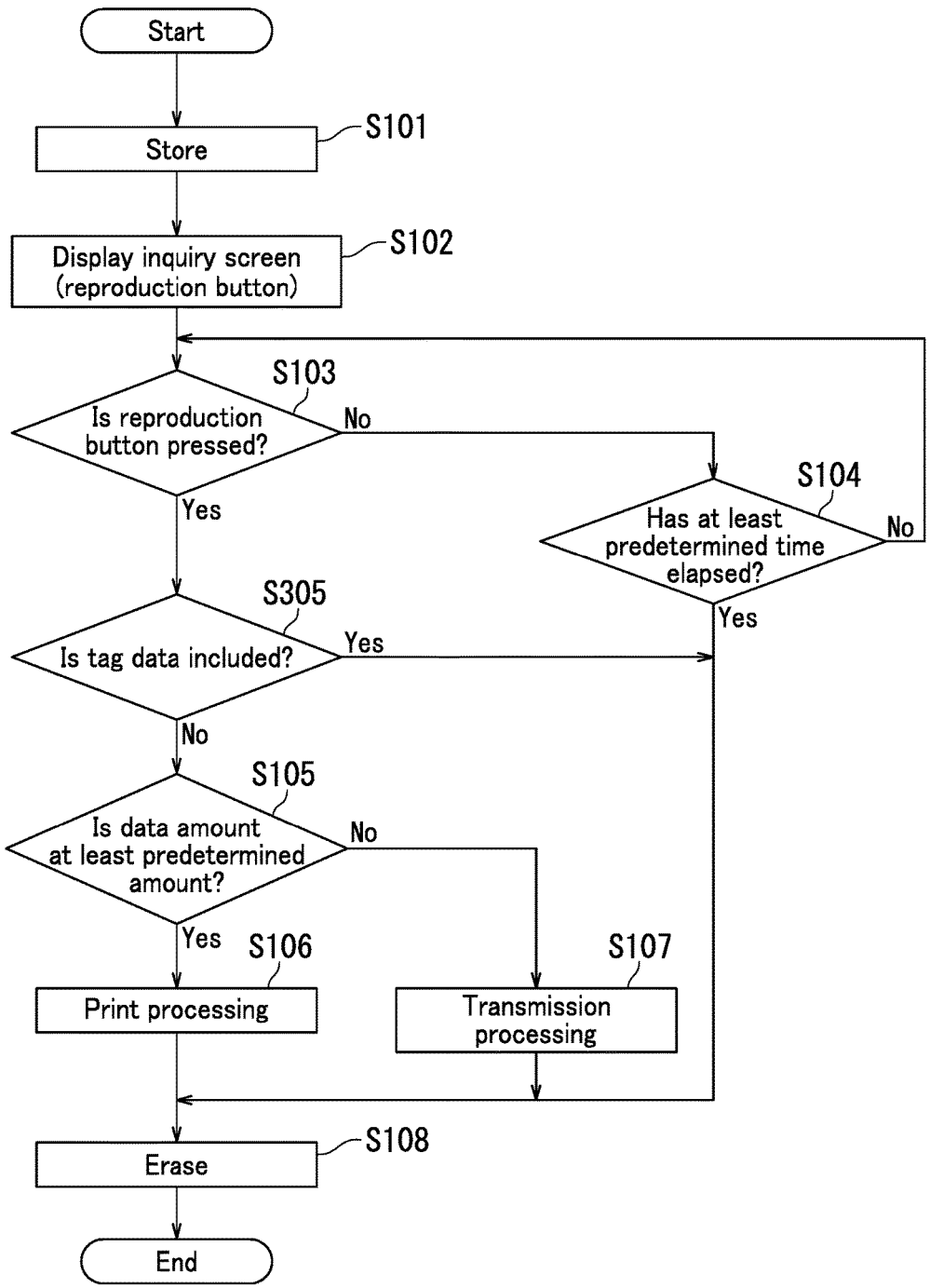
FIG. 16 is a flowchart illustrating operation of an information processing device according to the eighth embodiment of the present disclosure.

The following describes operation of the information processing device 1 (processing performed by the processing section 11) according to the eighth embodiment. FIG. 16 is a flowchart illustrating the operation of the information processing device 1 (processing performed by the processing section 11) according to the eighth embodiment. As illustrated in FIG. 16, the processing performed by the processing section 11 according to the eighth embodiment includes Step S305 in addition to the processing illustrated in FIG. 4.

When determining that the reproduction button 32 is pressed while the inquiry screen 30 is displayed (Yes at Step S103), the processing section 11 closes the inquiry screen 30 and determines whether or not the erasure target file data 19 includes the tag data 22 (Step S305). In other words, the processing section 11 determines whether or not the contents data 21 is confidential information. When determining that the erasure target file data 19 does not include the tag data 22 (No at Step S305), the processing section 11 proceeds to Step S105. By contrast, when determining that the erasure target file data 19 includes the tag data 22 (Yes at Step S305), the processing section 11 erases the erasure target file data 19 from the second storage 17 (Step S108). The processing illustrated in FIG. 16 ends then.

Through the above, the eighth embodiment has been described. According to the eighth embodiment, in a situation in which the erasure target contents are confidential information, the erasure target contents are not reproduced even when the reproduction button 32 is pressed. Therefore, a possibility of leakage of confidential information can be reduced. Also, according to the eighth embodiment, whether or not the erasure target contents are confidential information can be determined by simply determining whether or not the file data 19 includes the tag data 22. Therefore, whether or not the erasure target contents are confidential information can be easily determined.

Note that the information processing device 1 may execute the transfer processing described in the seventh embodiment instead of the print processing (Step S106) and the transmission processing (Step S107).

Ninth Embodiment

The following describes a ninth embodiment of the present disclosure with reference to FIGS. 1 to 3, 5, 6, 17, and 18. However, description of the same matter as the first through eighth embodiments will be omitted and only matter different from the first through eighth embodiments will be described. Data stored in the first storage 16 of the information processing device 1 in the ninth embodiment differs from that in the first through eighth embodiments.

Figure 17:
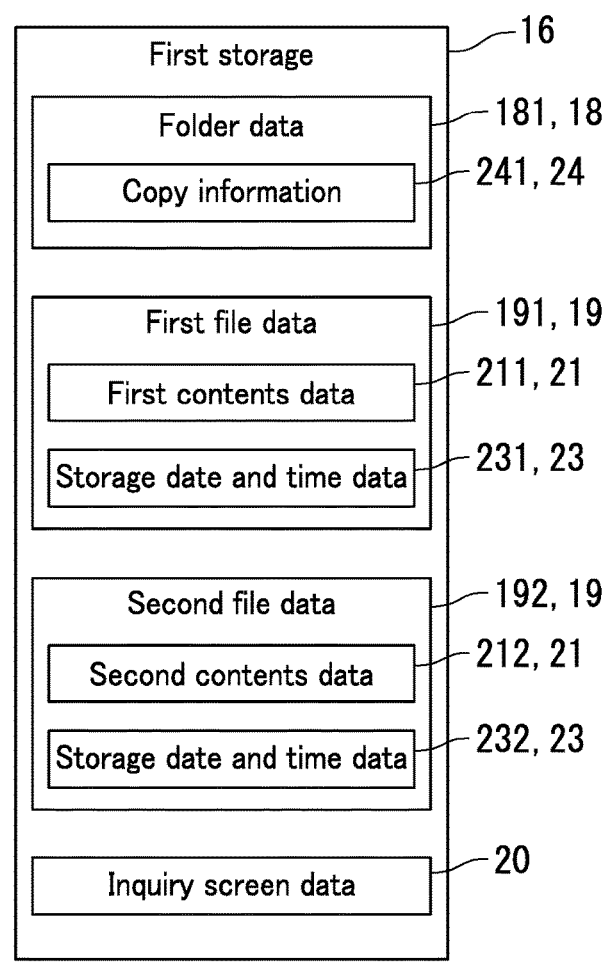
FIG. 17 is a diagram illustrating data stored in first storage of an information processing device according to a ninth embodiment of the present disclosure.

FIG. 17 is a diagram illustrating the data stored in the first storage 16 of the information processing device 1 according to the ninth embodiment. The folder data 18 according to the ninth embodiment further includes copy information 24. The copy information 24 is produced as a result of a duplicate (duplicated file data) of given file data 19 being generated (stored) in a folder where the given file data 19 is stored. The copy information 24 indicates correspondence between the duplicate and the file data 19 (original file data) for which the duplicate is generated. The file data 19 according to the ninth embodiment further includes storage date and time data 23. The storage date and time data 23 indicates the latest date and time at which the file data 19 has been stored.

The file data 19 according to the ninth embodiment includes first file data 191 and second file data 192. The first file data 191 and the second file data 192 are stored in the same folder. The first file data 191 includes first contents data 211 and storage date and time data 231. Similarly, the second file data 192 includes second contents data 212 and storage date and time data 232.

The second file data 192 in the present embodiment is a duplicate (duplicated file data) of the first file data 191. Specifically, the second file data 192 is equivalent to first file data 191 stored at date and time later than that indicated by the storage date and time data 231 of the first file data 191. Accordingly, the storage date and time data 232 of the second file data 192 indicates date and time later than that indicated by the storage date and time data 231 of the first file data 191.

The folder data 18 according to the ninth embodiment includes folder data 181. The folder data 181 is data of a folder in which the first file data 191 and the second file data 192 are stored. The folder data 181 includes copy information 241. The copy information 241 indicates correspondence between the first file data 191 and the second file data 192. In the following description, file data 19 corresponding to given file data 19 may be referred to as corresponding file data 19a. In the present embodiment, the second file data 192 is corresponding file data 19a for the first file data 191, and the first file data 191 is corresponding file data 19a for the second file data 192.

Note that the number of corresponding file data 19a is not limited to one. For example, in a situation in which a duplicate of file data A is file data B and a duplicate of the file data B is file data C, the copy information 24 indicates correspondence among the file data A, B, and C. Alternatively, in a situation in which file data B and C are duplicates of file data A generated at respective different dates and times, the copy information 24 indicates correspondence among the file data A, B, and C. When the file data A, B, and C correspond with one another, the file data B and C are corresponding file data 19a for the file data A, the file data C and A are corresponding file data 19a for the file data B, and the file data A and B are corresponding file data 19a for the file data C.

Figure 18:
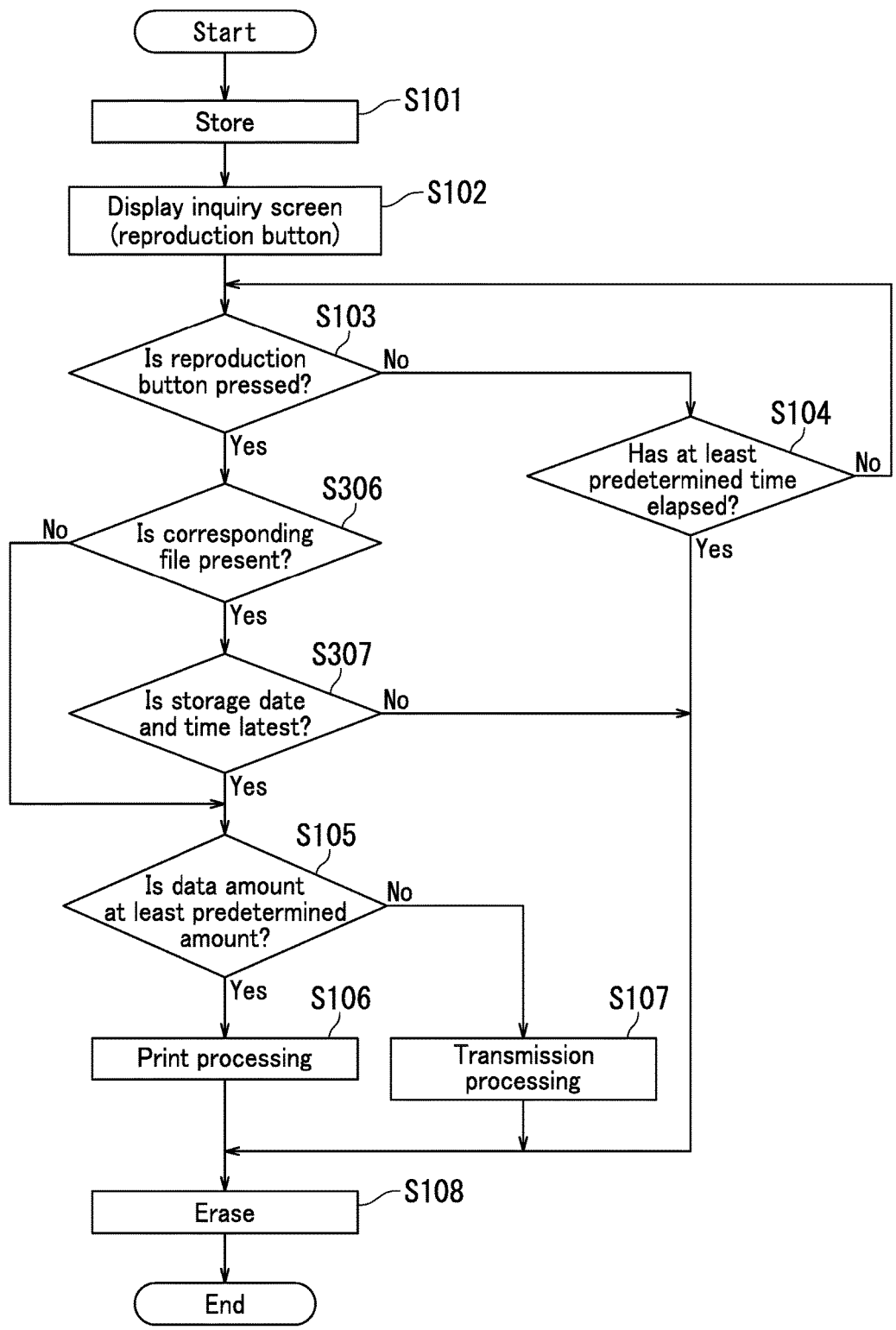
FIG. 18 is a flowchart illustrating operation of the information processing device according to the ninth embodiment of the present disclosure.

The following describes operation of the information processing device 1 (processing performed by the processing section 11) according to the ninth embodiment. FIG. 18 is a flowchart illustrating the operation of the information processing device 1 (processing performed by the processing section 11) according to the ninth embodiment. As illustrated in FIG. 18, the processing performed by the processing section 11 according to the ninth embodiment further includes Steps S306 and S307 in addition to the processing illustrated in FIG. 4.

When determining that the reproduction button 32 is pressed while the inquiry screen 30 is displayed (Yes at Step S103), the processing section 11 closes the inquiry screen 30 and accesses folder data 18 of a folder in which the erasure target file data 19 is stored. Then, the processing section 11 determines by referring to the folder data 18 whether or not corresponding file data 19a for the erasure target file data 19 is present (Step S306).

When determining that the corresponding file data 19a is absent (No at Step S306), the processing section 11 proceeds to Step S105. As a result, the contents reproduction processing (print processing at Step S106 or transmission processing at Step S107) is executed and then the erasure target file data 19 is erased from the second storage 17 (Step S108).

By contrast, when determining that the corresponding file data 19a is present (Yes at Step S306), the processing section 11 refers to storage date and time data 23 of the erasure target file data 19 and storage date and time data 23 of the corresponding file data 19a. Then, the processing section 11 determines whether or not date and time at which the erasure target file data 19 has been stored is later than date and time at which the corresponding file data 19a has been stored (Step S307).

When determining that the date and time at which the erasure target file data 19 has been stored is later than the date and time at which the corresponding file data 19a has been stored (Yes at Step S307), the processing section 11 proceeds to Step S105.

By contrast, when determining that the date and time at which the erasure target file data 19 has been stored is not later than the date and time at which the corresponding file data 19a has been stored (No at Step S307), the processing section 11 proceeds to Step S108. As a result, the erasure target file data 19 is erased from the second storage 17 without execution of the contents reproduction processing (Step S108).

In the present embodiment, in a situation in which the first file data 191 is the erasure target file data 19, the processing section 11 determines by referring to the folder data 181 that the second file data 192 is the corresponding file data 19a for the first file data 191 and refers to the storage date and time data 231 of the first file data 191 and the storage date and time data 232 of the second file data 192. As a result, the processing section 11 determines that the date and time at which the first file data 191 as the erasure target has been stored is later than the date and time at which the second file data 192 has been stored, executes the contents reproduction processing (print processing at Step S106 or transmission processing at Step S107) on the first file data 191, and then erases the first file data 191 from the second storage 17 (Step S108).

By contrast, in a situation in which the second file data 192 is the erasure target file data 19, the processing section 11 determines by referring to the folder data 181 that the first file data 191 is the corresponding file data 19a for the second file data 192 and refers to the storage date and time data 232 of the second file data 192 and the storage date and time data 231 of the first file data 191. As a result, the processing section 11 determines that the date and time at which the second file data 192 as the erasure target has been stored is not later than the date and time at which the first file data 191 has been stored and erases the second file data 192 from the second storage 17 without executing the contents reproduction processing on the second file data 192 (Step S108).

Through the above, the ninth embodiment has been described. According to the ninth embodiment, the contents reproduction processing is not executed in a situation in which corresponding file data 19a stored later than the erasure target file data 19 is present. In the above configuration, consumption of the recording medium such as paper can be reduced. Also, the number of transmission of emails is reduced, and therefore, it is possible to reduce a possibility that available capacity of a storage area of the mail server 3 allocated to the user of the information processing device 1 runs short.

Also, the folder data 18 in the ninth embodiment includes the copy information 24. The folder data 18 includes information for identifying each piece of file data 19 stored in the same folder and the copy information 24 indicates relationship among pieces of file data 19 stored in the same folder (i.e., indicates which piece of file data 19 is original and which piece of file data 19 is a duplicate thereof). Therefore, it can be easily determined whether or not corresponding file data 19a for the erasure target file data 19 is present by referring to the folder data 18 of a folder in which the erasure target file data 19 is stored. Also, in a situation in which the corresponding file data 19a for the erasure target file data 19 is present, the corresponding file data 19a can be easily identified.

Note that whether or not to execute the contents reproduction processing may be determined depending only on a result of determination as to whether or not the corresponding file data 19a for the erasure target file data 19 is present. Specifically, the processing section 11 may execute the contents reproduction processing only when the corresponding file data 19a is absent. In this case, Step S307 in the flow illustrated in FIG. 18 is omitted. Also, when determining that the corresponding file data 19a is present (Yes at Step S306), the processing section 11 proceeds to Step S108.

Although the first storage 16 in the present embodiment stores therein the folder data 18 including the copy information 24, the first storage 16 may store therein the copy information 24 in association with the folder data 18.

The copy information 24 may be produced as a result of a duplicate (duplicated file data) of given file data 19 being generated (stored) in the folder where the given file data 19 is stored or in a folder other than the folder where the given file data 19 is stored. In this case, the first storage 16 stores therein copy information 24 independent of the folder data 18. This copy information 24 includes information for identifying the file data 19 for which a duplicate has been generated (i.e., original file data) and information for identifying the duplicate.

The information processing device 1 may execute the transfer processing described in the seventh embodiment instead of the print processing (Step S106) and the transmission processing (Step S107).

The information processing device 1 may determine whether or not the erasure target contents are confidential information as described in the eighth embodiment. In this case, the information processing device 1 does not execute the contents reproduction processing regardless of the presence or absence of the corresponding file data 19a when determining that the erasure target contents are confidential information.

Tenth Embodiment

Figure 19:
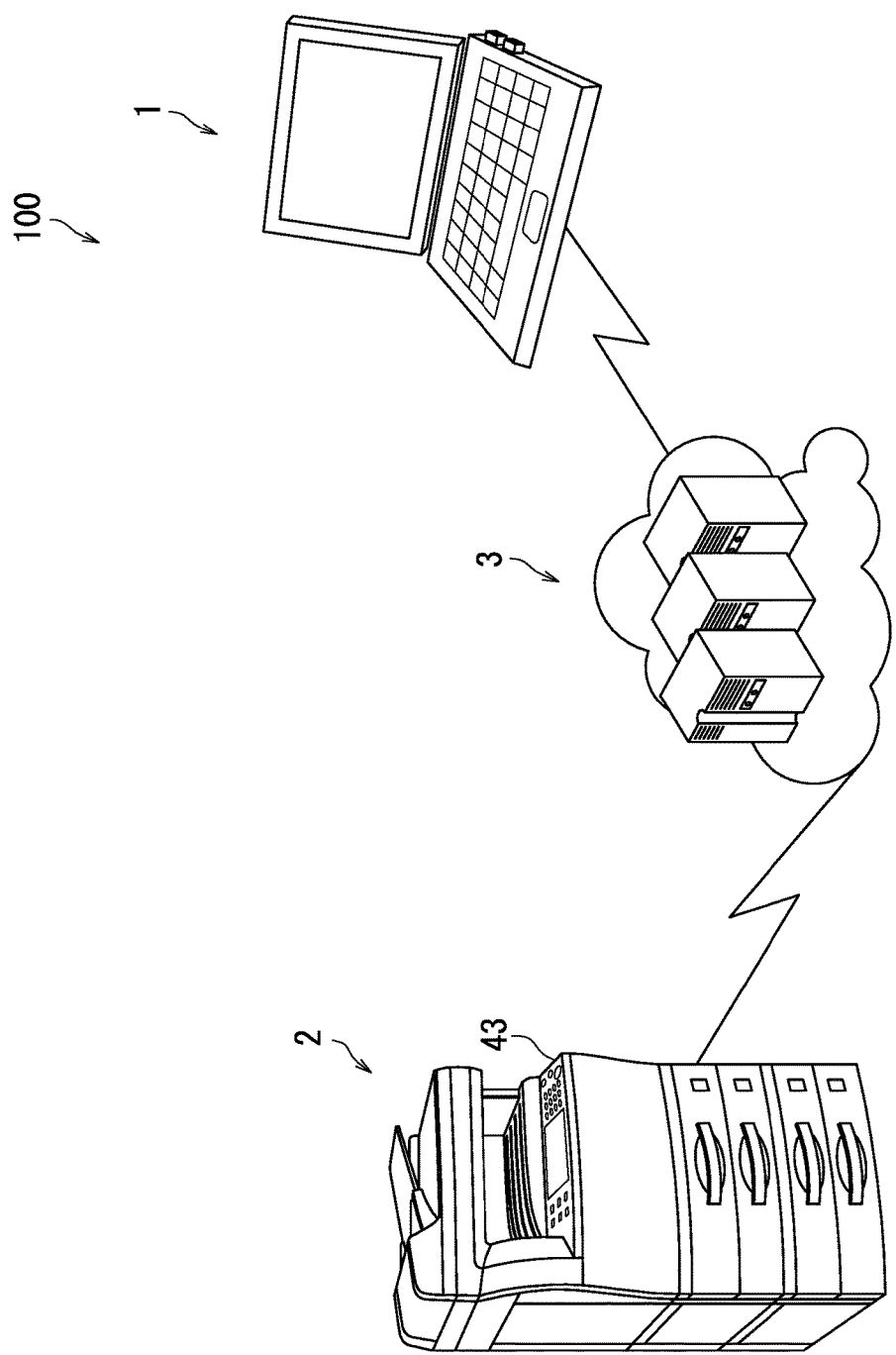
FIG. 19 is a diagram illustrating a file restoration system according to a tenth embodiment of the present disclosure.
Figure 20:
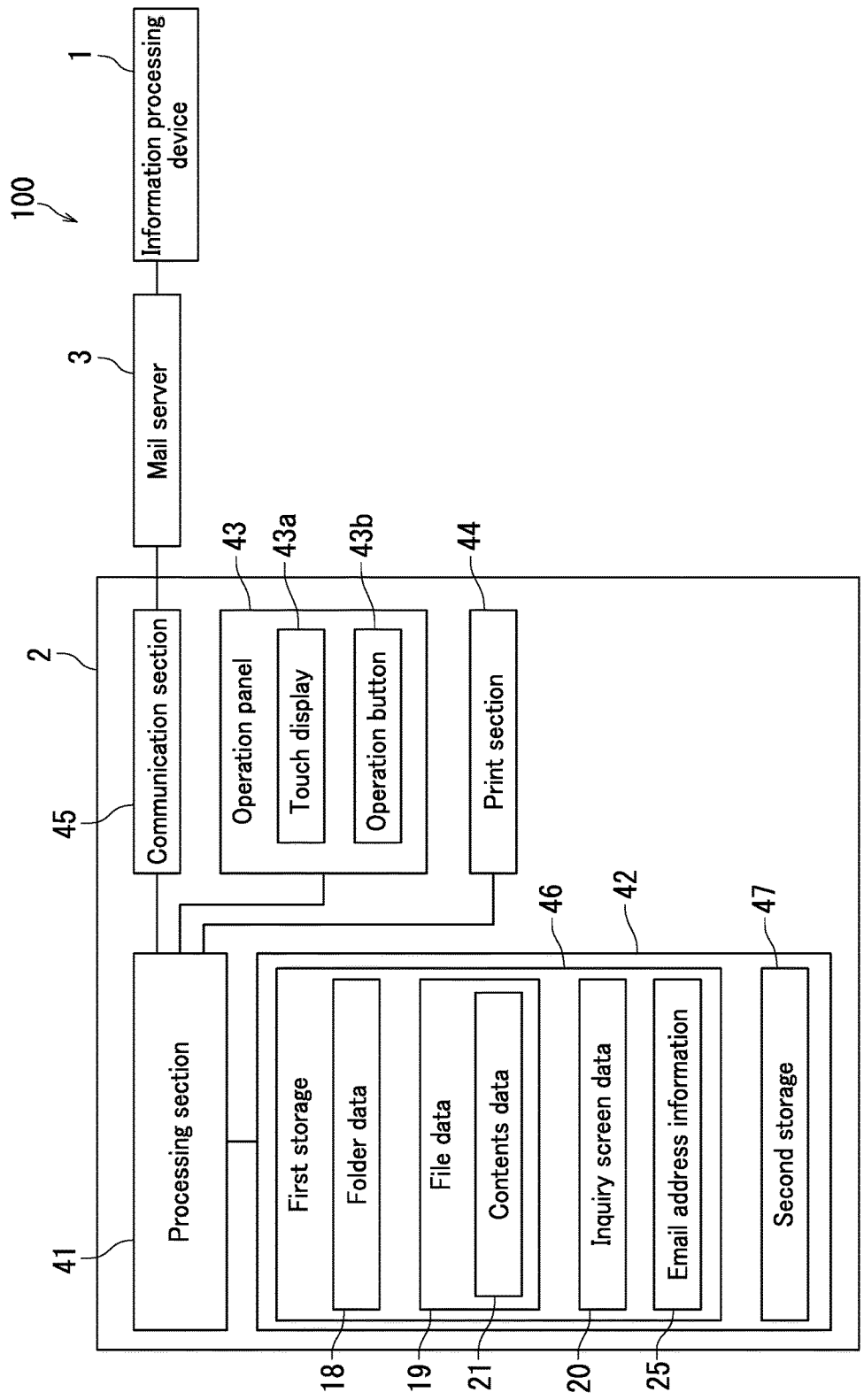
FIG. 20 is a block diagram illustrating a configuration of a printing device according to the tenth embodiment of the present disclosure.
Figure 21:
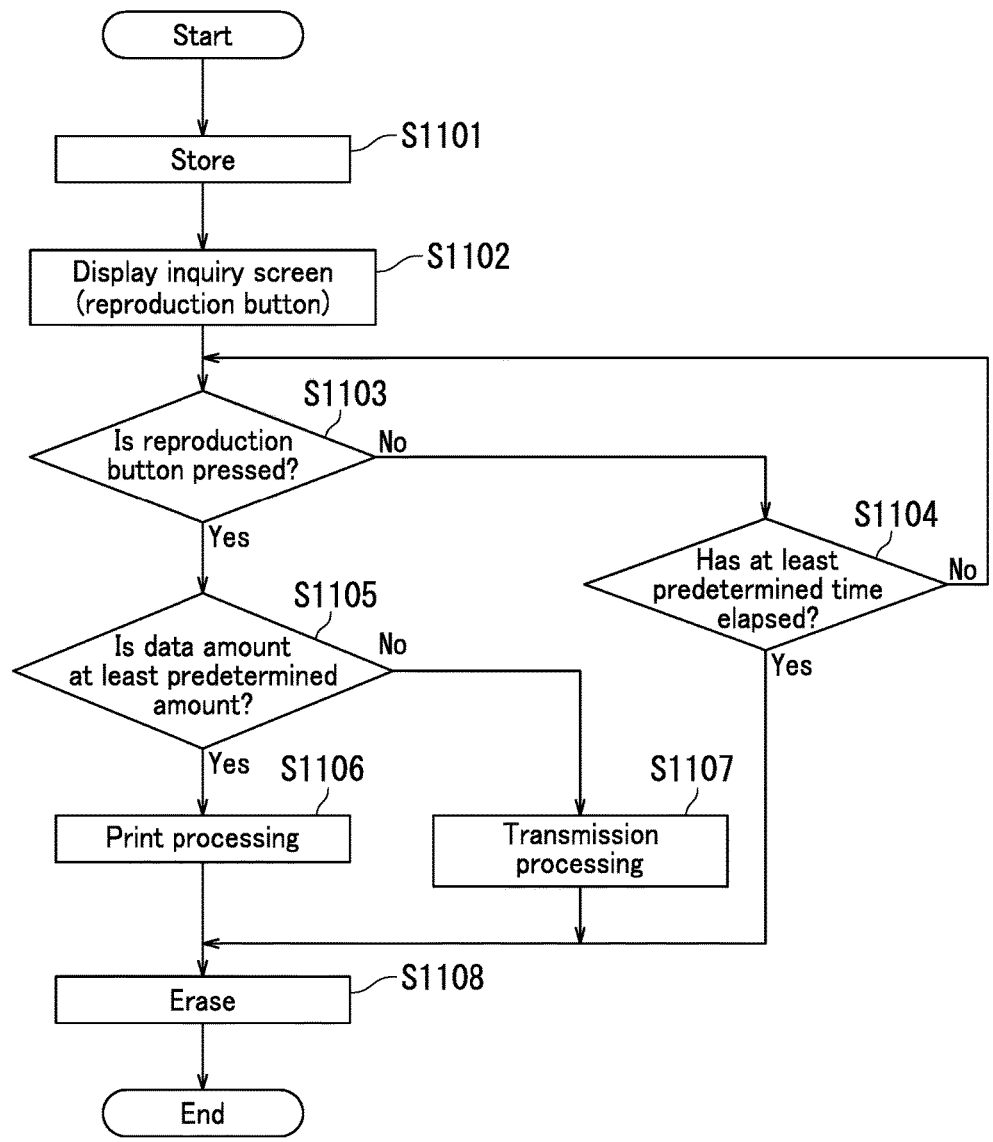
FIG. 21 is a flowchart illustrating operation of the printing device according to the tenth embodiment of the present disclosure.

The following describes a tenth embodiment of the present disclosure with reference to FIGS. 19 to 21. However, description of the same matter as the first through ninth embodiments will be omitted and only matter different from the first through ninth embodiments will be described. Unlike in the first through ninth embodiments, the printing device 2 manages files (electronic files) in the tenth embodiment.

FIG. 19 is a diagram illustrating the file restoration system 100 (file reproduction system) according to the tenth embodiment. As illustrated in FIG. 19, the file restoration system 100 according to the tenth embodiment includes the information processing device 1, the printing device 2, and the mail server 3. The printing device 2 in the tenth embodiment corresponds to the electronic device according to the present disclosure. Note that the printing device 2 in the tenth embodiment is a multifunction peripheral. However, the printing device 2 is not limited to the multifunction peripheral and is only required to be capable of transmitting an email to the mail server 3. For example, the printing device 2 may be a copier or a printer.

FIG. 20 is a block diagram illustrating a configuration of the printing device 2 according to the tenth embodiment. As illustrated in FIG. 20, the printing device 2 according to the tenth embodiment includes a processing section 41, storage 42, an operation panel 43, a print section 44, and a communication section 45.

The processing section 41 includes a processor such as a CPU. The processing section 41 further includes an electronic component for image processing such as an application specific integrated circuit (ASIC). The processing section 41 receives data and signals from respective sections of the printing device 2. Also, the processing section 41 controls operation of the respective sections of the printing device 2 through execution of programs stored in the storage 42. For example, the processing section 41 generates a print job based on image data received from an external source. The image data received from the external source is converted into image data for printing by the electronic component for image processing. Alternatively, in a configuration in which the printing device 2 includes a scanner, the processing section 41 generates a print job based on image data of a document read by the scanner. The processing section 41 controls the print section 44 based on the print job. Through the above, an image is printed on a recording medium such as paper.

The storage 42 includes memory such as a ROM device and a RAM device. Further, the storage 42 includes a storage device such as an HDD or an SSD. The ROM device typically stores therein firmware. The firmware is software for controlling a computer system (hardware) installed in the printing device 2 (electronic device). The RAM device typically stores therein an operating system (OS). The RAM device also serves as a working area of the processor. The storage device typically stores therein application programs, setting values, and the like. Also, the storage device stores therein various images (image data) to be displayed on the operation panel 43. The image data includes image data of an operation screen. The image data of the operation screen includes image data of a layout image or the like. The operation screen is for example a dialogue box screen through which various information can be entered.

The storage 42 in the tenth embodiment includes first storage 46 and second storage 47. The first storage 46 is typically constituted by an HDD or an SSD. The second storage 47 is typically constituted by a RAM device. For example, the second storage 47 may be constituted by an SDRAM device. Therefore, the second storage 47 typically has smaller capacity than the first storage 46 and a higher access speed than the first storage 46. For the above reasons, the second storage 47 can be used as cache memory or buffer memory.

The first storage 46 according to the tenth embodiment stores therein folder data 18, file data 19, inquiry screen data 20, and email address information 25. The email address information 25 indicates an email address registered for a user of the printing device 2. The email address may be registered by the user or a third person authorized to change settings of the printing device 2.

When the operation panel 43 receives an instruction for erasing the file data 19, the second storage 47 stores the file data 19. Specifically, when the operation panel 43 receives the instruction for erasing the file data 19, the processing section 41 transfers the file data 19 from the first storage 46 to the second storage 47. As a result, the file data 19 is erased from the first storage 46. Also, the processing section 41 updates the folder data 18 upon erasure of the file data 19 from the first storage 46.

The operation panel 43 includes a touch display 43a and an operation button 43b. The touch display 43a includes a display and a touch sensor. The touch sensor is superposed on a display surface of the display. The touch sensor receives an instruction from a user. That is, the user can enter an instruction to the printing device 2 by touching a touch surface of the touch display 43a. The display is for example a liquid crystal display or an organic EL display. The touch display 43a (display) displays various images and various screens under control by the processing section 41. For example, the processing section 41 causes the touch display 43a to display an inquiry screen based on the inquiry screen data 20.

The operation button 43b is a hard key. The operation button 43b includes for example a numeric key and a start key. The operation button 43b receives an instruction from the user. That is, the user can enter an instruction to the printing device 2 through an operation on the operation button 43b.

The touch display 43a in the present embodiment displays the inquiry screen 30 (reproduction button 32) described with reference to FIG. 3. While the inquiry screen 30 is displayed, the touch display 43a (operation panel 43) is enabled to receive an instruction for reproducing a file erased from the first storage 46. In the tenth embodiment, the user can give an instruction for file reproduction by touching the touch surface of the touch display 43a to press the reproduction button 32. Upon detection of the reproduction button 32 being pressed, the processing section 41 executes the contents reproduction processing (contents restoration processing).

The print section 44 prints (forms) an image on a recording medium such as paper. The print section 44 prints (forms) an image for example by an electrophotographic process or an inkjet process. In a case of printing an image by the electrophotographic process, the print section 44 is loaded with toner and prints (forms) the image using the toner. In a case of printing an image by the inkjet process, the print section 44 is loaded with ink and prints (forms) the image using ink droplets.

In the case of printing (forming) an image using the toner, the print section 44 typically includes a photosensitive drum and a fixing device. Further, the print section 44 includes a charger, a light exposure device, a development device, and a transfer device, which are arranged around the photosensitive drum. The charger uniformly charges a circumferential surface of the photosensitive drum. The light exposure device emits a laser beam based on image data to form an electrostatic latent image on the circumferential surface of the photosensitive drum. The development device develops the electrostatic latent image by supplying the toner. As a result, a toner image is formed on the circumferential surface of the photosensitive drum. The transfer device transfers the toner image onto a recording medium. The fixing device fixes the toner image to the recording medium through application of pressure and heat to the recording medium. In the case of printing an image using the ink droplets, the print section 44 typically includes a recording head. The recording head prints (forms) an image on a recording medium by ejecting ink droplets thereto.

The communication section 45 is for example a communication interface. In a configuration in which the communication section 45 is the communication interface, the communication section 45 may include a connector connected to a network cable. The communication section 45 is connected to the mail server 3. The communication section 45 is connected to the mail server 3 for example via a public network such as the Internet. The printing device 2 (processing section 41) transmits an email to the mail server 3 through the communication section 45. The processing section 41 in the present embodiment acquires an email address registered for a user who has logged in to the printing device 2 by referring to the email address information 25. The processing section 41 sets the acquired email address as a destination of an email and transmits the email to the mail server 3 through the communication section 45. As a result, the email is transmitted to the information processing device 1 which is registered beforehand as a destination for the user who has logged in to the printing device 2.

The following describes operation of the printing device 2 (processing performed by the processing section 41) according to the tenth embodiment with reference to FIGS. 19 to 21. FIG. 21 is a flowchart illustrating the operation of the printing device 2 (processing performed by the processing section 41) according to the tenth embodiment. The processing illustrated in FIG. 21 is the same as that illustrated in FIG. 4. The contents reproduction processing according to the tenth embodiment includes the print processing (Step S1106) and the transmission processing (Step S1107).

The processing illustrated in FIG. 21 (operation of the printing device 2) starts when the operation panel 43 receives an instruction for erasing the file data 19. When the operation panel 43 receives the instruction for erasing the file data 19, the processing section 41 initially reads the erasure target file data 19 from the first storage 46. As a result, the erasure target file data 19 is erased from the first storage 46. Then, the processing section 41 stores in the second storage 47 the erasure target file data 19 read from the first storage 46 (Step S1101).

After storing the erasure target file data 19 in the second storage 47, the processing section 41 causes the operation panel 43 (touch display 43a) to display the inquiry screen 30 (reproduction button 32) (Step S1102). When the operation panel 43 displays the inquiry screen 30, the processing section 41 starts time measurement processing. For example, the processing section 41 includes a timer and activates the timer when the operation panel 43 displays the inquiry screen 30.

When the operation panel 43 displays the inquiry screen 30, the processing section 41 determines whether or not the reproduction button 32 is pressed (Step S1103). When determining that the reproduction button 32 is not pressed (No at Step S1103), the processing section 41 determines whether or not an elapsed time is at least a predetermined time (Step S1104). Specifically, the processing section 41 determines whether or not at least the predetermined time has elapsed from when the inquiry screen 30 is displayed by the operation panel 43. The predetermined time (threshold value) is stored in the first storage 46 in advance. For example, the processing section 41 determines whether or not a count value of the timer has reached a predetermined value. When determining that the elapsed time is shorter than the predetermined time (No at Step S1104), the processing section 41 returns to Step S1103. The predetermined time is for example two minutes. Note that the predetermined time may be a setting value that can be set by the user through the operation panel 43.

When determining that the reproduction button 32 is pressed (Yes at Step S1103), the processing section 41 closes the inquiry screen 30 (deletes the inquiry screen 30 from a display screen) and determines whether or not a data amount of erasure target contents data 21 is at least a predetermined amount (Step S1105). The predetermined amount (threshold value) is stored in the first storage 46 in advance. The predetermined amount is for example 10 megabytes (MB). Note that the predetermined amount may be a setting value that can be set by the user through the operation panel 43.

When determining that the data amount of the erasure target contents data 21 is at least the predetermined amount (Yes at Step S1105), the processing section 41 executes the print processing (Step S1106). The print processing executed by the processing section 41 is processing for causing the print section 44 to print contents of the erasure target file data 19. When determining that the data amount of the erasure target contents data 21 is less than the predetermined amount (No at Step S1105), the processing section 41 executes the transmission processing (Step S1107). The transmission processing executed by the processing section 41 is processing for transmitting through the mail server 3 an email with the erasure target file data 19 attached thereto to the information processing device 1 which is registered beforehand as the destination for the user who has logged in to the printing device 2.

After executing the print processing (Step S1106) or the transmission processing (Step S1107), the processing section 41 erases the erasure target file data 19 from the second storage 47 (Step S1108). The processing illustrated in FIG. 21 ends upon erasure of the erasure target file data 19 from the second storage 47. Alternatively, when determining that the elapsed time is equal to or longer than the predetermined time (Yes at Step S1104), the processing section 41 closes the inquiry screen 30 and erases the erasure target file data 19 from the second storage 47 (Step S1108). The processing illustrated in FIG. 21 ends then.

Through the above, the tenth embodiment has been described. According to the tenth embodiment, even when a necessary file has been erased by an erroneous operation by the user (i.e., the file has been erased by mistake), the user can acquire contents of the erased file. Specifically, in a situation in which a data amount of the contents erased from the printing device 2 (electronic device) is at least the predetermined amount, the user can acquire printed matter on which the contents are printed. In a situation in which the data amount of the contents erased from the printing device 2 (electronic device) is less than the predetermined amount, the user can acquire an email with the contents attached thereto.

Also, according to the tenth embodiment, in a situation in which the data amount of the contents erased from the printing device 2 (electronic device) is less than the predetermined amount, the email with the contents attached thereto is transmitted. Thus, the email is transmitted to the mail server 3 in a situation in which the data amount of the file data 19 is relatively small. Therefore, it is possible to reduce a possibility that available capacity of a storage area of the mail server 3 allocated to the user who has logged in to the printing device 2 runs short.

Also, according to the tenth embodiment, the inquiry screen 30 (reproduction button 32) disappears from the display screen when the predetermined time elapses from when the inquiry screen 30 (reproduction button 32) is displayed. Therefore, the user is not required to perform any operation in a situation in which the user erased the file intentionally.

Note that the first storage 46 may store a plurality of files therein. Also, the first storage 46 may store a plurality of folders therein.

The communication section 45 of the printing device 2 can be connected to the information processing device 1 not via the mail server. For example, the communication section 45 may be connected to the information processing device 1 via a LAN. In this case, an email is transmitted from the printing device 2 to the information processing device 1 not via the mail server.

The printing device 2 may execute the transfer process described in the seventh embodiment instead of the print processing (Step S1106) and the transmission processing (Step S1107).

The printing device 2 may determine whether or not the erasure target file data 19 is confidential information as described in the eighth embodiment. In this case, when determining that the erasure target file data 19 is confidential information, the printing device 2 does not execute the contents reproduction processing.

The printing device 2 may determine whether or not to execute the contents reproduction processing according to the presence or absence of corresponding file data 19a for the erasure target file data 19 as described in the ninth embodiment.

Eleventh Embodiment

Figure 22:
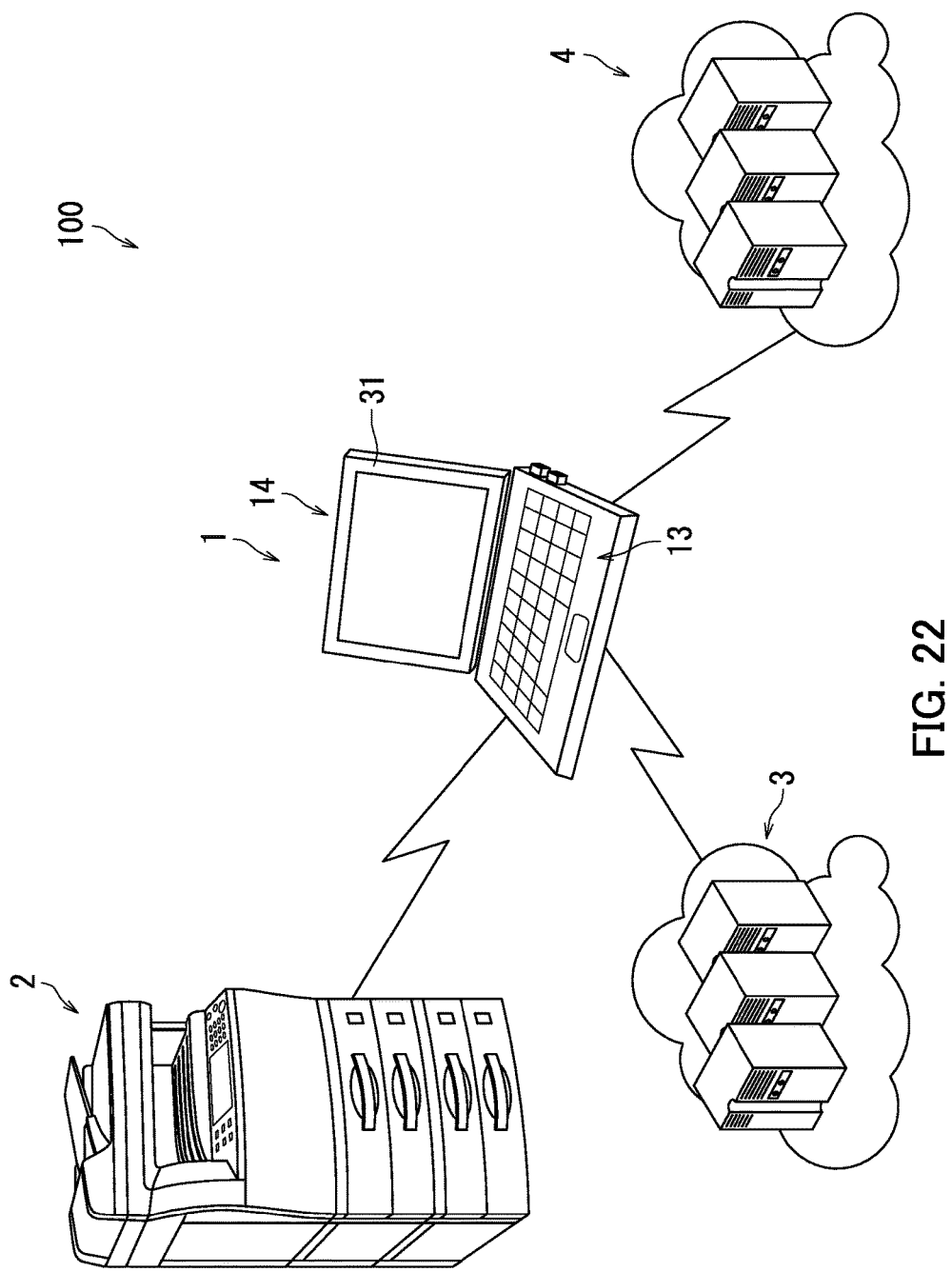
FIG. 22 is a diagram illustrating a file restoration system according to an eleventh embodiment of the present disclosure.
Figure 23:
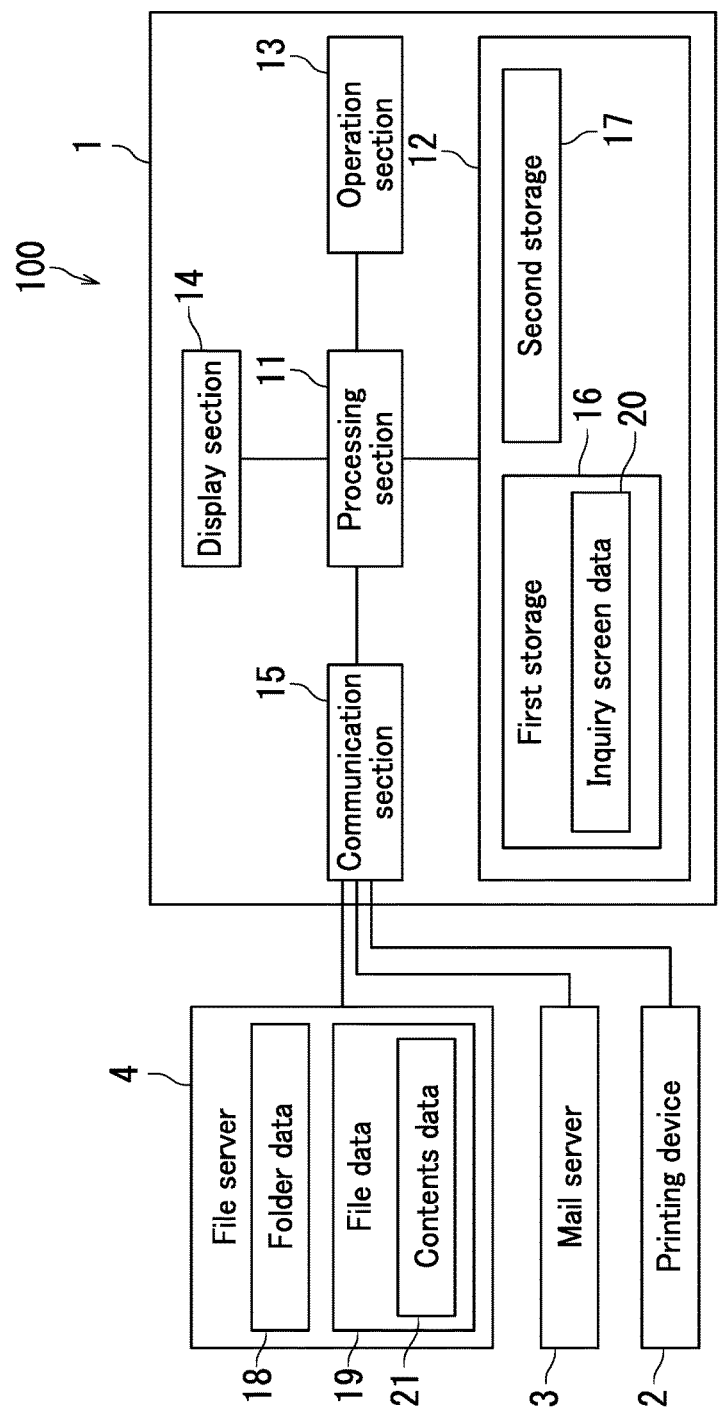
FIG. 23 is a block diagram illustrating configurations of an information processing device and a file server according to the eleventh embodiment of the present disclosure.
Figure 24:
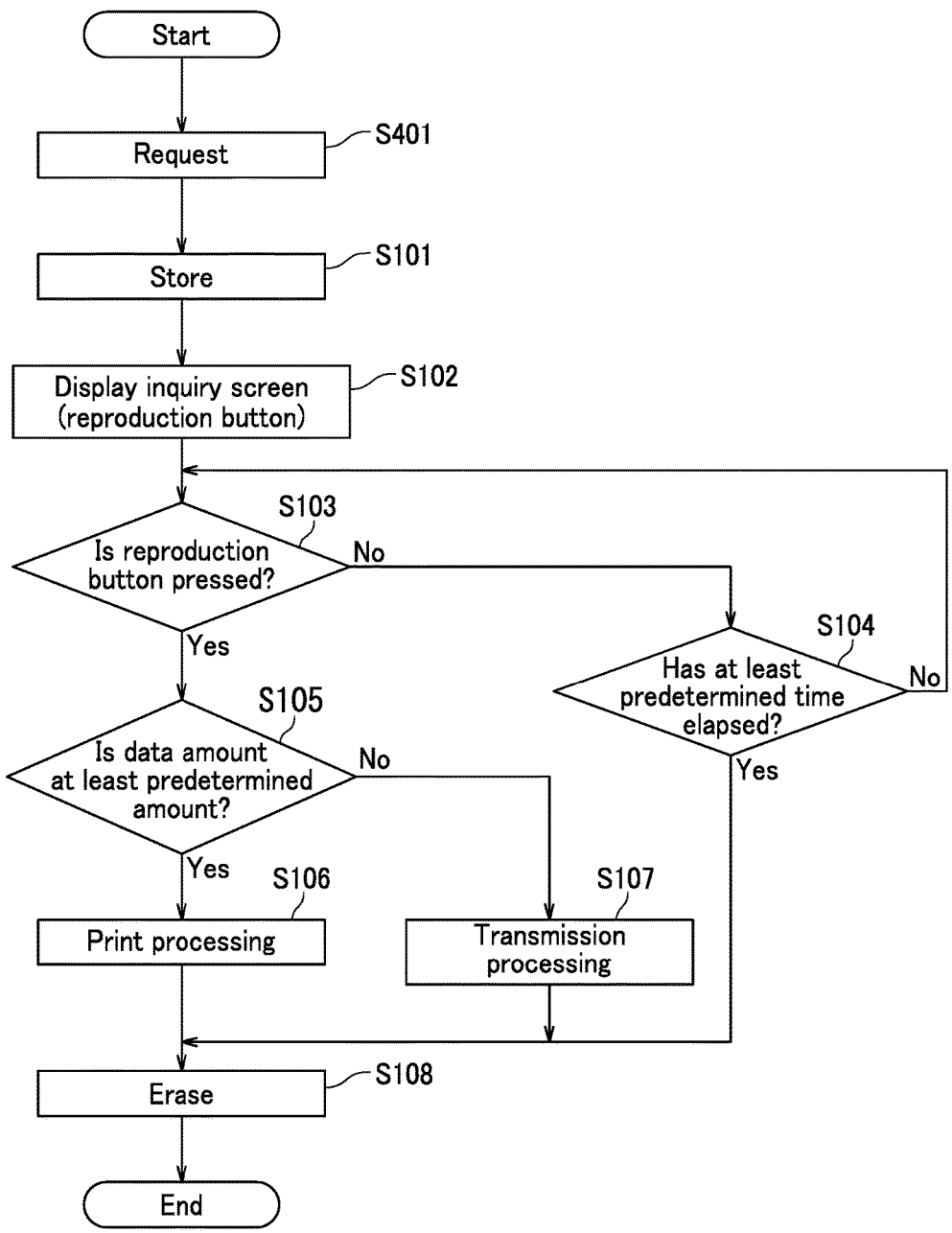
FIG. 24 is a flowchart illustrating operation of the information processing device according to the eleventh embodiment of the present disclosure.

The following describes an eleventh embodiment of the present disclosure with reference to FIGS. 22 to 24. However, description of the same matter as the first through tenth embodiments will be omitted and only matter different from the first through tenth embodiments will be described. Unlike in the first through tenth embodiments, a file server 4 manages files (electronic files) in the eleventh embodiment. The file server 4 corresponds to a file management device according to the present disclosure.

FIG. 22 is a diagram illustrating the file restoration system 100 (file reproduction system) according to the eleventh embodiment. As illustrated in FIG. 22, the file restoration system 100 according to the eleventh embodiment includes the information processing device 1, the printing device 2, the mail server 3, and the file server 4. The information processing device 1 in the eleventh embodiment corresponds to the electronic device according to the present disclosure.

FIG. 23 is a block diagram illustrating configurations of the information processing device 1 and the file server 4 according to the eleventh embodiment. As illustrated in FIG. 23, the file server 4 stores therein the folder data 18 and the file data 19.

The communication section 15 of the information processing device 1 according to the eleventh embodiment is connected to the file server 4 for example via a public network such as the Internet or a LAN. The information processing device 1 according to the eleventh embodiment performs data communication with the file server 4 through the communication section 15.

The information processing device 1 according to the eleventh embodiment operates the file server 4. For example, the information processing device 1 causes the file server 4 to store the file data 19 or erase the file data 19. Specifically, the information processing device 1 acquires the folder data 18 and the file data 19 from the file server 4. In response to the above acquisition, the display section 14 displays a folder screen. The user can enter via the folder screen for example an instruction for erasing the file data 19 through an operation on the operation section 13. When the user enters the instruction for erasing the file data 19, the information processing device 1 requests the file server 4 to erase the file data 19.

The first storage 16 of the information processing device 1 according to the eleventh embodiment temporarily stores therein the folder data 18 and the file data 19 acquired by the processing section 11 from the file server 4. When communication between the information processing device 1 and the file server 4 is completed, the folder data 18 and the file data 19 are erased from the first storage 16. Also, when the user enters the instruction for erasing the file data 19, the processing section 11 transfers the file data 19 from the first storage 16 to the second storage 17.

Note that the display section 14 in the present embodiment displays the inquiry screen 30 (reproduction button 32) described with reference to FIG. 3.

The following describes operation of the information processing device 1 (processing performed by the processing section 11) according to the eleventh embodiment. FIG. 24 is a flowchart illustrating the operation of the information processing device 1 (processing performed by the processing section 11) according to the eleventh embodiment. As illustrated in FIG. 24, the processing performed by the processing section 11 according to the eleventh embodiment further includes Step S401 in addition to the processing illustrated in FIG. 4.

The processing illustrated in FIG. 24 (operation of the information processing device 1) starts when the operation section 13 receives an instruction for erasing the file data 19. When the operation section 13 receives the instruction for erasing the file data 19, the processing section 11 initially requests the file server 4 to erase the erasure target file data 19 (Step S401). As a result, the erasure target file data 19 is erased from the file server 4.

Next, the processing section 11 reads the erasure target file data 19 from the first storage 16. As a result, the erasure target file data 19 is erased from the first storage 16. Then, the processing section 11 stores in the second storage 17 the erasure target file data 19 read from the first storage 16 (Step S101). Also, the processing section 11 updates the folder data 18 upon erasure of the file data 19 from the first storage 16. Further, the processing section 11 transmits the updated folder data 18 to the file server 4. As a result, the folder data 18 stored in the file server 4 is updated.

Through the above, the eleventh embodiment has been described. According to the eleventh embodiment, even when a necessary file has been erased by an erroneous operation by the user (i.e., the file has been erased by mistake), the user can acquire contents of the erased file. Specifically, in a situation in which a data amount of the contents erased from the file server 4 is at least a predetermined amount, the user can acquire printed matter on which the contents are printed. In a situation in which the data amount of the contents erased from the file server 4 is less than the predetermined amount, the user can acquire an email with the contents attached thereto.

Note that the information processing device 1 may determine whether or not the erasure target file data 19 is confidential information as described in the eighth embodiment. In this case, when determining that the erasure target file data 19 is confidential information, the information processing device 1 does not execute the contents reproduction processing.

Also, the information processing device 1 may determine whether or not to execute the contents reproduction processing according to the presence or absence of corresponding file data 19a for the erasure target file data 19 as described in the ninth embodiment.

Twelfth Embodiment

Figure 25:
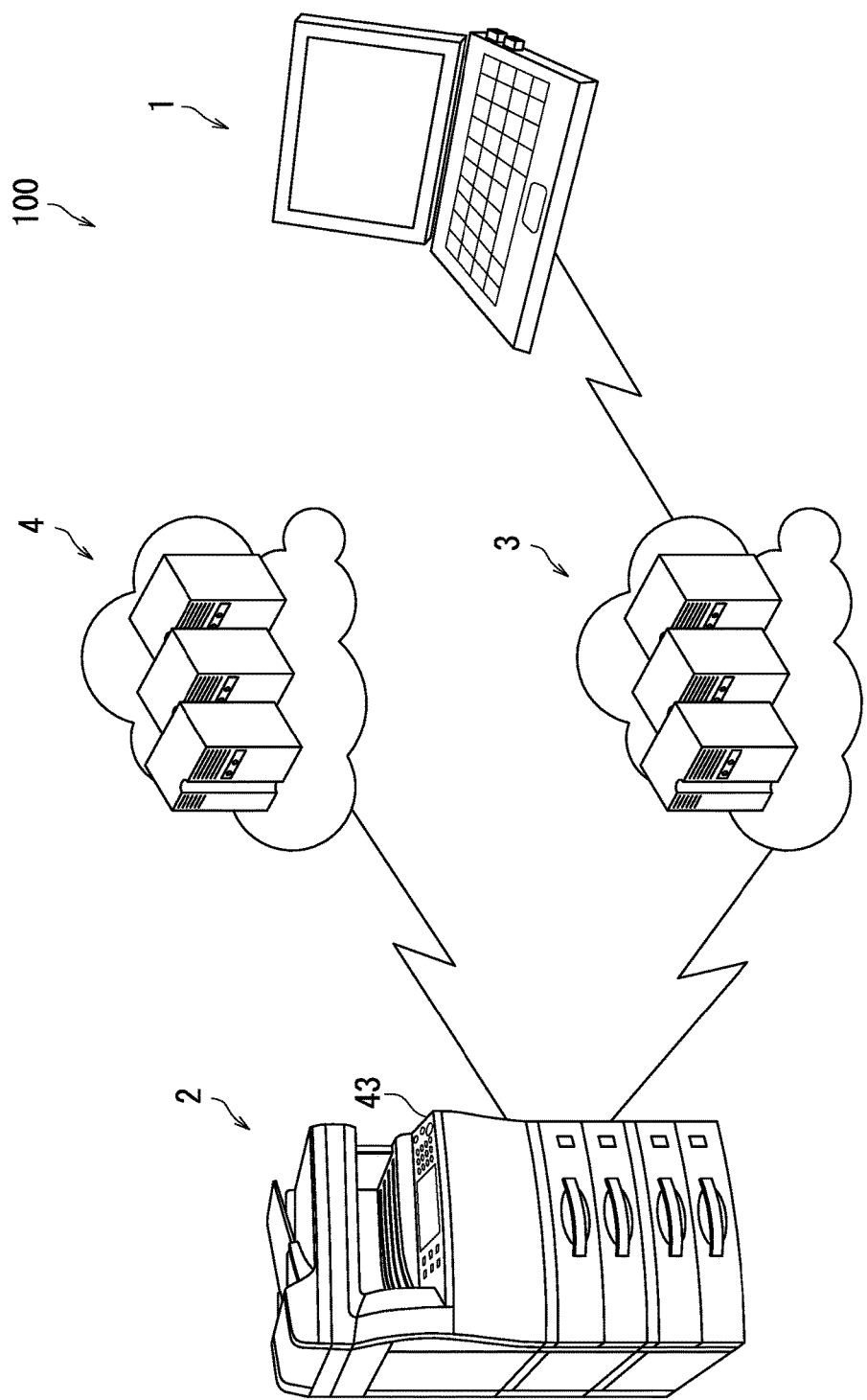
FIG. 25 is a diagram illustrating a file restoration system according to a twelfth embodiment of the present disclosure.
Figure 26:
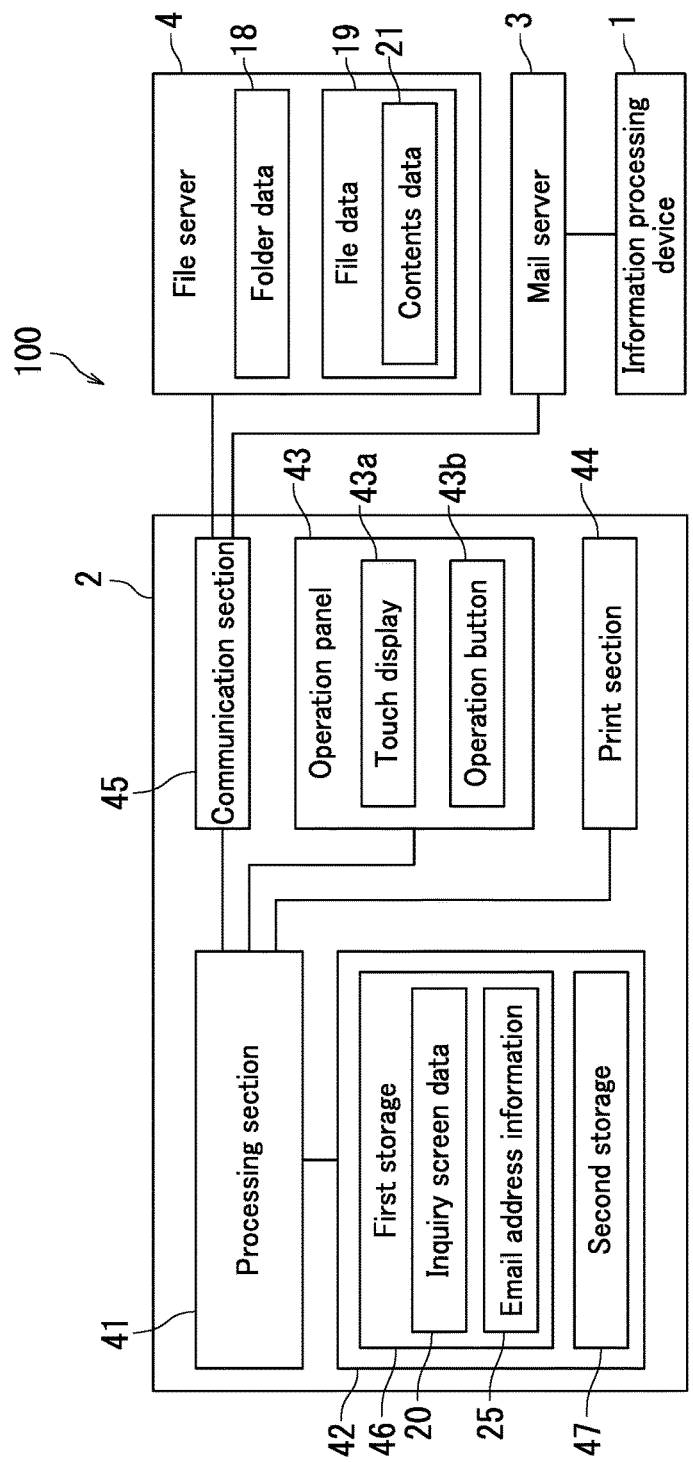
FIG. 26 is a block diagram illustrating configurations of a printing device and a file server according to the twelfth embodiment of the present disclosure.
Figure 27:
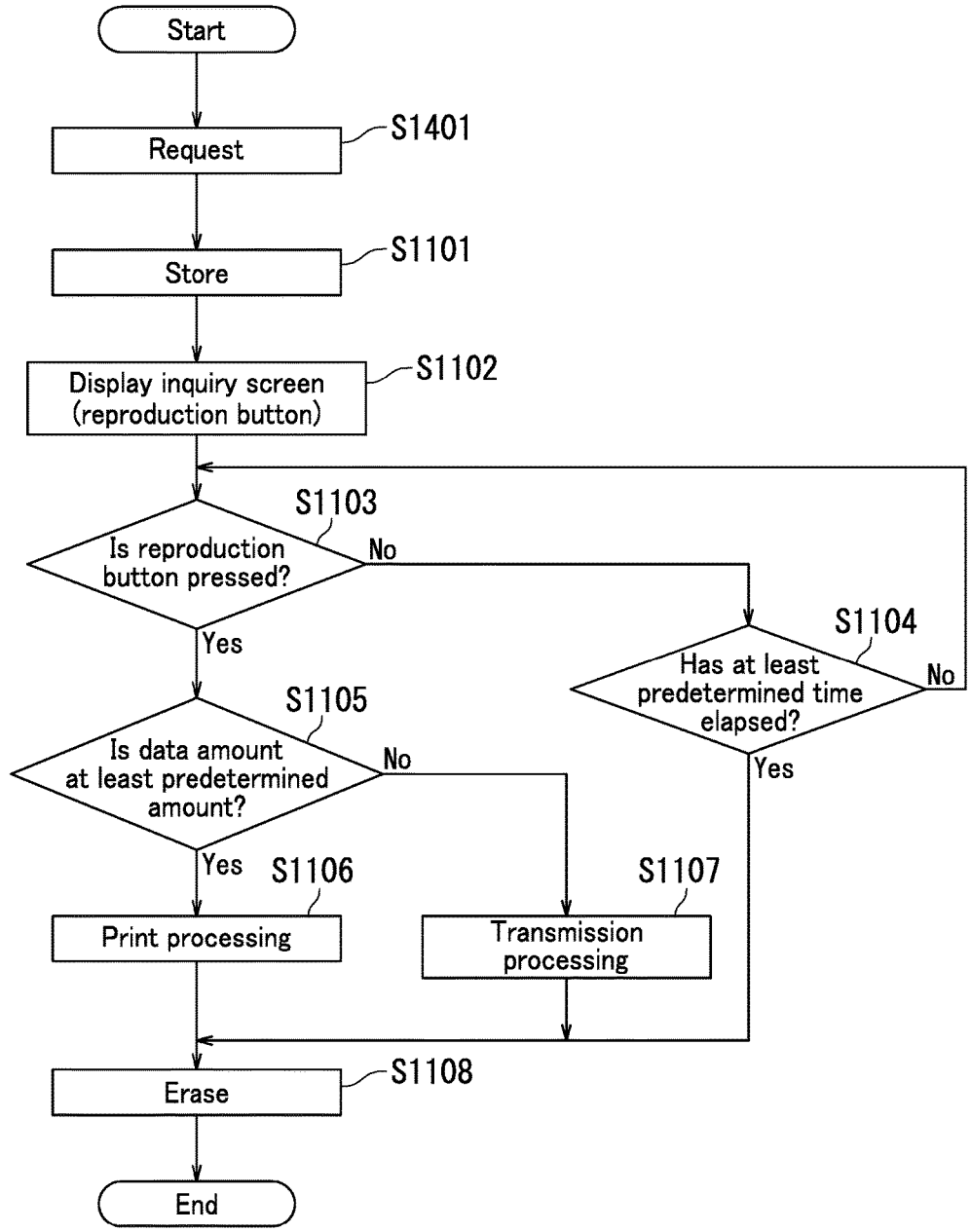
FIG. 27 is a flowchart illustrating operation of the printing device according to the twelfth embodiment of the present disclosure.

The following describes a twelfth embodiment of the present disclosure with reference to FIGS. 25 to 27. However, description of the same matter as the first through eleventh embodiments will be omitted and only matter different from the first through eleventh embodiments will be described. Unlike in the first through eleventh embodiments, the printing device 2 operates the file server 4 in the twelfth embodiment.

FIG. 25 is a diagram illustrating the file restoration system 100 (file reproduction system) according to the twelfth embodiment. As illustrated in FIG. 25, the file restoration system 100 according to the twelfth embodiment includes the information processing device 1, the printing device 2, the mail server 3, and the file server 4. The printing device 2 in the twelfth embodiment corresponds to the electronic device according to the present disclosure.

FIG. 26 is a block diagram illustrating configurations of the printing device 2 and the file server 4 according to the twelfth embodiment. As illustrated in FIG. 26, the file server 4 manages files (electronic files).

The communication section 45 of the printing device 2 according to the twelfth embodiment is connected to the file server 4 for example via a public network such as the Internet or a LAN. The printing device 2 according to the twelfth embodiment performs data communication with the file server 4 through the communication section 45.

The printing device 2 according to the twelfth embodiment operates the file server 4. For example, the printing device 2 causes the file server 4 to store the file data 19 or erase the file data 19. Specifically, the printing device 2 acquires the folder data 18 and the file data 19 from the file server 4. In response to the above acquisition, the operation panel 43 (touch display 43a) displays a folder screen. The user can enter via the folder screen for example an instruction for erasing the file data 19 through an operation on the operation panel 43. When the user enters the instruction for erasing the file data 19, the printing device 2 requests the file server 4 to erase the file data 19.

The first storage 46 of the printing device 2 according to the twelfth embodiment temporarily stores therein the folder data 18 and the file data 19 acquired by the processing section 41 from the file server 4. When communication between the printing device 2 and the file server 4 is completed, the folder data 18 and the file data 19 are erased from the first storage 46. Also, when the user enters the instruction for erasing the file data 19, the processing section 41 transfers the file data 19 from the first storage 46 to the second storage 47.

In the present embodiment, the operation panel 43 (touch display 43a) displays the inquiry screen 30 (reproduction button 32) described with reference to FIG. 3.

The following describes operation of the printing device 2 (processing performed by the processing section 41) according to the twelfth embodiment. FIG. 27 is a flowchart illustrating the operation of the printing device 2 (processing performed by the processing section 41) according to the twelfth embodiment. As illustrated in FIG. 27, the processing performed by the processing section 41 according to the twelfth embodiment further includes Step S1401 in addition to the processing illustrated in FIG. 21.

The processing illustrated in FIG. 27 (operation of the printing device 2) starts when the operation panel 43 receives an instruction for erasing the file data 19. When the operation panel 43 receives the instruction for erasing the file data 19, the processing section 41 initially requests the file server 4 to erase the erasure target file data 19 (Step S1401). As a result, the erasure target file data 19 is erased from the file server 4.

Next, the processing section 41 reads the erasure target file data 19 from the first storage 46. As a result, the erasure target file data 19 is erased from the first storage 46. Then, the processing section 41 stores in the second storage 47 the erasure target file data 19 read from the first storage 46 (Step S1101). Also, the processing section 41 updates the folder data 18 upon erasure of the file data 19 from the first storage 46. Further, the processing section 41 transmits the updated folder data 18 to the file server 4. As a result, the folder data 18 stored in the file server 4 is updated.

Through the above, the twelfth embodiment has been described. According to the twelfth embodiment, even when a necessary file has been erased by an erroneous operation by the user (i.e., the file has been erased by mistake), the user can acquire contents of the erased file. Specifically, in a situation in which a data amount of the contents erased from the file server 4 is at least a predetermined amount, the user can acquire printed matter on which the contents are printed. In a situation in which the data amount of the contents erased from the file server 4 is less than the predetermined amount, the user can acquire an email with the contents attached thereto.

The printing device 2 may determine whether or not the erasure target file data 19 is confidential information as described in the eighth embodiment. In this case, when determining that the erasure target file data 19 is confidential information, the printing device 2 does not execute the contents reproduction processing.

Also, the printing device 2 may determine whether or not to execute the contents reproduction processing according to the presence or absence of corresponding file data 19a for the erasure target file data 19 as described in the ninth embodiment.

Through the above, the embodiments of the present disclosure have been described with reference to the drawings. However, the present disclosure is not limited to the above-described embodiments and can be practiced in various forms within a scope not departing from the gist of the present disclosure.

For example, the information processing device 1 and the printing device 2 have been described each as the electronic device according to the present disclosure in the above embodiments. However, the electronic device according to the present disclosure may be a file server. In this case, an email is transmitted to the information processing device registered beforehand as a destination for the user who has logged in to the file server.

Although the inquiry screen 30 is displayed when the user enters an instruction for erasing the file data 19 in the above embodiments, the present disclosure is not limited to this configuration. The inquiry screen 30 may be displayed when the erasure target file data 19 is erased, a folder in which the erasure target file data 19 has been stored is closed, and then, an instruction for opening the folder is received from the user.

Matter described in the respective embodiments may be appropriately combined. For example, although the inquiry screen 30 described with reference to FIG. 3 is displayed in the fourth through twelfth embodiments, the present disclosure is not limited to this configuration. The inquiry screen 30 described with reference to FIG. 7 or 9 may be displayed in the fourth through twelfth embodiments. Although either of the print processing and the transmission processing is selected and executed according to the data amount of the erasure target contents in the eighth through twelfth embodiments similarly to the first embodiment, the present disclosure is not limited to this configuration. In the eighth through twelfth embodiments, either of the print processing and the transmission processing may be selected and executed according to the number of pages of the erasure target contents similarly to the fourth embodiment, according to the number of pages and the data amount of the erasure target contents similarly to the fifth embodiment, or according to the type of the file similarly to the sixth embodiment.

What is claimed is:

1. An electronic device comprising:
   an operation section that receives an instruction from a user;
   first storage storing therein data of a file including contents that can be printed;
   second storage;
   a processing section that transfers the data of the file from the first storage to the second storage when the operation section receives an instruction for erasing the file; and
   a display section that displays an inquiry screen for inquiring whether or not to reproduce the file when the data of the file is transferred from the first storage to the second storage, wherein
   when the operation section receives an instruction for reproducing the file while the inquiry screen is displayed, the processing section executes print processing for printing the contents of the file, transmission processing for transmitting an email with the data of the file attached thereto, or transfer processing for transferring the data of the file from the second storage to the first storage, and
   when executing the print processing or the transmission processing, the processing section erases the data of the file from the second storage after the execution of the print processing or the transmission processing.

2. The electronic device according to claim 1, wherein
   when the operation section receives the instruction for reproducing the file, the processing section determines whether or not a data amount of the file is at least a predetermined amount,
   when determining that the data amount of the file is at least the predetermined amount, the processing section executes the print processing, and
   when determining that the data amount of the file is less than the predetermined amount, the processing section executes the transmission processing.

3. The electronic device according to claim 1, wherein
   when the operation section receives the instruction for reproducing the file, the processing section determines whether or not the number of pages of the contents of the file is at least a predetermined number,
   when determining that the number of the pages of the contents of the file is at least the predetermined number, the processing section executes the print processing, and
   when determining that the number of the pages of the contents of the file is smaller than the predetermined number, the processing section executes the transmission processing.

4. The electronic device according to claim 1, wherein
   when the operation section receives the instruction for reproducing the file, the processing section determines whether or not a data amount of the file is no greater than a predetermined amount,
   when determining that the data amount of the file is greater than the predetermined amount, the processing section executes the print processing,
   when determining that the data amount of the file is no greater than the predetermined amount, the processing section determines whether or not the number of pages of the contents of the file is no greater than a predetermined number, when determining that the number of the pages of the contents of the file is greater than the predetermined number, the processing section executes the transmission processing, and when determining that the number of the pages of the contents of the file is no greater than the predetermined number, the processing section executes the print processing.

5. The electronic device according to claim 1, wherein
when the operation section receives the instruction for reproducing the file, the processing section determines whether or not a type of the file is any one of at least one predetermined type, when determining that the type of the file is one of the at least one predetermined type, the processing section executes the print processing, and when determining that the type of the file is none of the at least one predetermined type, the processing section executes the transmission processing.

6. The electronic device according to claim 1, wherein
when the operation section receives the instruction for reproducing the file, the processing section determines whether or not the contents of the file are confidential information, when determining that the contents of the file are not confidential information, the processing section executes the print processing, the transmission processing, or the transfer processing, and when determining that the contents of the file are confidential information, the processing section does not execute the print processing, the transmission processing, and the transfer processing.

7. The electronic device according to claim 1, wherein
when the operation section receives the instruction for reproducing the file, the processing section determines whether or not data of a corresponding file corresponding to the file is stored in the first storage, when determining that the data of the corresponding file is not stored in the first storage, the processing section executes the print processing, the transmission processing, or the transfer processing, and when determining that the data of the corresponding file is stored in the first storage, the processing section does not execute the print processing, the transmission processing, and the transfer processing.

8. The electronic device according to claim 7, wherein
the file and the corresponding file are stored in the same folder.

9. The electronic device according to claim 1, wherein
when the operation section receives the instruction for reproducing the file, the processing section determines whether or not data of a corresponding file corresponding to the file is stored in the first storage, when determining that the data of the corresponding file is not stored in the first storage, the processing section executes the print processing, the transmission processing, or the transfer processing, when determining that the data of the corresponding file is stored in the first storage, the processing section determines whether or not date and time at which the file has been stored is later than date and time at which the corresponding file has been stored, when determining that the date and time at which the file has been stored is later than the date and time at which the corresponding file has been stored, the processing section executes the print processing, the transmission processing, or the transfer processing, and when determining that the date and time at which the file has been stored is not later than the date and time at which the corresponding file has been stored, the processing section does not execute the print processing, the transmission processing, and the transfer processing.

10. The electronic device according to claim 1, wherein
when executing the print processing, the processing section transmits to a printing device data for executing printing of the contents of the file.

11. The electronic device according to claim 1, further comprising
a print section that prints the contents of the file, wherein
when executing the print processing, the processing section causes the print section to execute printing of the contents of the file.

12. An electronic device capable of performing data communication with a file management device that manages data of a file including contents that can be printed, the electronic device comprising:

an operation section that receives an instruction from a user;

a communication section connected to the file management device;

a processing section that acquires the data of the file from the file management device through the communication section;

storage that stores, when the operation section receives an instruction for erasing the file, the data of the file acquired by the processing section; and a display section that displays, when the storage stores the data of the file, an inquiry screen for inquiring whether or not to reproduce the file, wherein when the operation section receives the instruction for erasing the file, the processing section requests the file management device to erase the data of the file, when the operation section receives an instruction for reproducing the file while the inquiry screen is displayed, the processing section executes print processing for printing the contents of the file or transmission processing for transmitting an email with the data of the file attached thereto, and after executing the print processing or the transmission processing, the processing section erases the data of the file from the storage.

13. The electronic device according to claim 12, wherein
when executing the print processing, the processing section transmits to a printing device data for executing printing of the contents of the file.

14. The electronic device according to claim 12, further comprising
a print section that prints the contents of the file, wherein
when executing the print processing, the processing section causes the print section to execute printing of the contents of the file.

* * * * *